(12) United States Patent
Fujimoto et al.

(10) Patent No.: US 8,993,194 B2
(45) Date of Patent: Mar. 31, 2015

(54) FUEL CELL, CELL STACK, FUEL CELL MODULE, AND FUEL CELL DEVICE

(75) Inventors: Tetsurou Fujimoto, Kirishima (JP); Yuuichi Hori, Kirishima (JP); Takayuki Iwamoto, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 319 days.

(21) Appl. No.: 13/499,465

(22) PCT Filed: Oct. 28, 2010

(86) PCT No.: PCT/JP2010/069205
§ 371 (c)(1),
(2), (4) Date: Mar. 30, 2012

(87) PCT Pub. No.: WO2011/052692
PCT Pub. Date: May 5, 2011

(65) Prior Publication Data
US 2012/0189939 A1 Jul. 26, 2012

(30) Foreign Application Priority Data

| Oct. 28, 2009 | (JP) | 2009-247303 |
| Mar. 29, 2010 | (JP) | 2010-074583 |
| Mar. 29, 2010 | (JP) | 2010-074585 |

(51) Int. Cl.
*H01M 8/10* (2006.01)
*H01M 8/12* (2006.01)
(Continued)

(52) U.S. Cl.
CPC .......... *H01M 8/1213* (2013.01); *H01M 8/0236* (2013.01); *H01M 8/126* (2013.01);
(Continued)

(58) Field of Classification Search
CPC ... H01M 8/12; H01M 8/1253; H01M 8/0236; H01M 8/0245; H01M 8/1213; H01M 8/126
USPC .................................. 429/465, 482, 489, 496
See application file for complete search history.

(56) References Cited

U.S. PATENT DOCUMENTS 5,171,645 A * 12/1992 Khandkar ..................... 429/442
5,417,831 A    5/1995 Koch et al.
(Continued)

FOREIGN PATENT DOCUMENTS

CN    101507028 A    8/2009
EP     1528615 A2    5/2005
(Continued)

OTHER PUBLICATIONS

International Search Report dated Feb. 15, 2011, issued for International Application No. PCT/JP2010/069205.
(Continued)

*Primary Examiner* — Jonathan Jelsma
(74) *Attorney, Agent, or Firm* — Procopio, Cory, Hargreaves & Savitch LLP

(57) ABSTRACT

A fuel cell includes a solid electrolyte layer containing Zr; an intermediate layer containing $CeO_2$ solid solution having a rare-earth element excluding Ce; an air electrode layer containing Sr, the intermediate layer and the air electrode layer being stacked in this order on one surface of the solid electrolyte layer; and a fuel electrode layer on another surface of the solid electrolyte layer which is opposite to the one surface. A value obtained by dividing a content of the rare-earth element excluding Ce by a content of Zr is equal to or less than 0.05 at a site of the solid electrolyte layer, the site being 1 μm away from an interface between the solid electrolyte layer and the intermediate layer.

14 Claims, 4 Drawing Sheets

(51) Int. Cl.
*H01M 8/02* (2006.01)
*H01M 4/86* (2006.01)
*H01M 8/24* (2006.01)
*H01M 4/88* (2006.01)

(52) U.S. Cl.
CPC .......... *H01M8/1253* (2013.01); *H01M 4/8621* (2013.01); *H01M 4/8657* (2013.01); *H01M 8/2425* (2013.01); *Y02E 60/521* (2013.01); *Y02E 60/525* (2013.01); *H01M 4/881* (2013.01); *H01M 4/886* (2013.01); *H01M 2300/0094* (2013.01)
USPC ............ 429/496; 429/465; 429/482; 429/489

(56) References Cited

U.S. PATENT DOCUMENTS

| | | | |
|---|---|---|---|
| 2010/0112395 A1* | 5/2010 | Ogawa et al. | 429/19 |
| 2010/0167154 A1 | 7/2010 | Ono | |
| 2010/0266925 A1 | 10/2010 | Hori | |

FOREIGN PATENT DOCUMENTS

| | | | |
|---|---|---|---|
| EP | 2061108 A1 * | 5/2009 |
| JP | 01261267 A * | 10/1989 |
| JP | H09-129252 A | 5/1997 |
| JP | 2005-100816 A | 4/2005 |
| JP | 2005-327637 A | 11/2005 |
| JP | 2006-302602 A | 11/2006 |
| JP | 2007-059377 A | 3/2007 |
| JP | 2008-078126 A | 4/2008 |
| JP | 2008-226653 A | 9/2008 |
| JP | 2008-226654 A | 9/2008 |

OTHER PUBLICATIONS

Office Action dated Dec. 11, 2013, issued in counterpart Chinese application No. 201080043255.6.
Office Action dated Dec. 12, 2013, issued in counterpart Korean application No. 10-2012-7008211.
Extended European Search Report dateed Apr. 2, 2014 issued in Counterpart European Patent Application No. EP10826824.4.
Decision of Refusal dated May 26, 2014 issued for counterpart Korean application No. 10-2012-7008211.

* cited by examiner

FUEL CELL, CELL STACK, FUEL CELL MODULE, AND FUEL CELL DEVICE

TECHNICAL FIELD

The present invention relates to a fuel cell, a cell stack in which a plurality of fuel cells are arranged, a fuel cell module in which the cell stack is contained in a housing, and a fuel cell device including the fuel cell module.

BACKGROUND ART

Recently, various fuel cell modules in which a cell stack composed of a plurality of fuel cells capable of acquiring electric power using fuel gas (hydrogen-containing gas) and air (oxygen-containing gas) is contained in a housing, or various fuel cell devices in which the fuel cell modules are contained in an exterior case have been proposed as next-generation energy (for example, Patent Literature 1).

In such fuel cells, a fuel electrode layer containing Ni and $ZrO_2$ solid solution having a rare-earth element, a solid electrolyte layer containing $ZrO_2$ solid solution having a rare-earth element, and an air electrode layer formed of Sr-containing perovskite composite oxide are stacked in this order on a conductive support substrate.

However, since Sr contained in the air electrode layer diffuses into the solid electrolyte layer or Zr contained in the solid electrolyte layer diffuses into the air electrode layer in the course of manufacturing the fuel cells or generating electric power, there is a problem in that a high-resistance reaction product is formed and thus power generation performance of the fuel cells is deteriorated in power generation over a long period of time.

Therefore, the applicant proposes a fuel cell in which two intermediate layers formed of $CeO_2$ solid solution having a rare-earth element excluding Ce is disposed between the solid electrolyte layer and the air electrode layer, in order to suppress the diffusion of Sr contained in the air electrode layer into the solid electrolyte layer or the diffusion of Zr contained in the solid electrolyte layer into the air electrode layer and to suppress the formation of a high-resistance reaction product (for example, see Patent Literatures 2 to 4).

In the course of manufacturing a fuel cell or generating electric power using the fuel cell in which two intermediate layers formed of $CeO_2$ solid solution having a rare-earth element is disposed between the solid electrolyte layer and the air electrode layer, as described in Patent Literatures 2 to 4, when a large amount of rare-earth element excluding Ce in $CeO_2$ solid solution contained in the intermediate layer is present in the solid electrolyte layer (particularly, around the interface of the solid electrolyte layer with the intermediate layer), ionic conductivity in a low temperature range (550° C. to 650° C.) around the interface of the solid electrolyte layer with the intermediate layer is particularly lowered, thereby causing a problem in that the power generation performance at a low temperature is lowered.

Patent Literature 1: Japanese Unexamined Patent Publication JP-A 2007-59377
Patent Literature 2: Japanese Unexamined Patent Publication JP-A 2008-78126
Patent Literature 3: Japanese Unexamined Patent Publication JP-A 2008-226653
Patent Literature 4: Japanese Unexamined Patent Publication JP-A 2008-226654

SUMMARY OF INVENTION

The invention is made in consideration of the above-mentioned problems and relates to a fuel cell, a cell stack, a fuel cell module, and a fuel cell device, which have improved power generation performance at a low temperature.

A fuel cell according to an embodiment of the invention includes a solid electrolyte layer containing Zr; an intermediate layer containing $CeO_2$ solid solution having a rare-earth element excluding Ce; an air electrode layer containing Sr, the intermediate layer and the air electrode layer being stacked in this order on one surface of the solid electrolyte layer; and a fuel electrode layer on another surface of the solid electrolyte layer which is opposite to the one surface, wherein a value obtained by dividing a content of the rare-earth element excluding Ce by a content of Zr is equal to or less than 0.05 at a site of the solid electrolyte layer, the site being 1 μm away from an interface between the solid electrolyte layer and the intermediate layer.

A fuel cell according to another embodiment of the invention includes a solid electrolyte layer containing Zr and Y; an intermediate layer containing $CeO_2$ solid solution having a rare-earth element excluding Ce; an air electrode layer containing Sr, the intermediate layer and the air electrode layer being stacked in this order on one surface of the solid electrolyte layer; and a fuel electrode layer on another surface of the solid electrolyte layer which is opposite to the one surface, wherein a value obtained by dividing a maximum content of Y in a site of the solid electrolyte layer within 1 μm from an interface thereof with the intermediate layer by a content of Zr is equal to or less than 0.25.

In the fuel cell, it is possible to suppress lowering of the ionic conductivity in a low temperature range around the interface of the solid electrolyte layer with the intermediate layer and thus to provide a fuel cell with improved power generation performance.

A cell stack according to an embodiment of the invention includes a plurality of fuel cells mentioned above, wherein the plurality of fuel cells are electrically connected in series to each other, and therefore it is possible to provide a cell stack with improved power generation performance at a low temperature.

A fuel cell module according to an embodiment of the invention includes the cell stack mentioned above and a housing configured to receive the cell stack therein, and therefore it is possible to provide a fuel cell module with improved power generation performance at a low temperature.

A fuel cell device according to an embodiment of the invention includes the fuel cell module mentioned above, an auxiliary device configured to operate the cell stack, and an exterior case configured to receive the fuel cell module and the auxiliary device therein, and therefore it is possible to provide a fuel cell device with improved power generation performance at a low temperature.

Advantageous Effects of Invention

According to the embodiments of the invention, it is possible to improve power generation performance at a low temperature.

DESCRIPTION OF EMBODIMENTS

Figure 1:
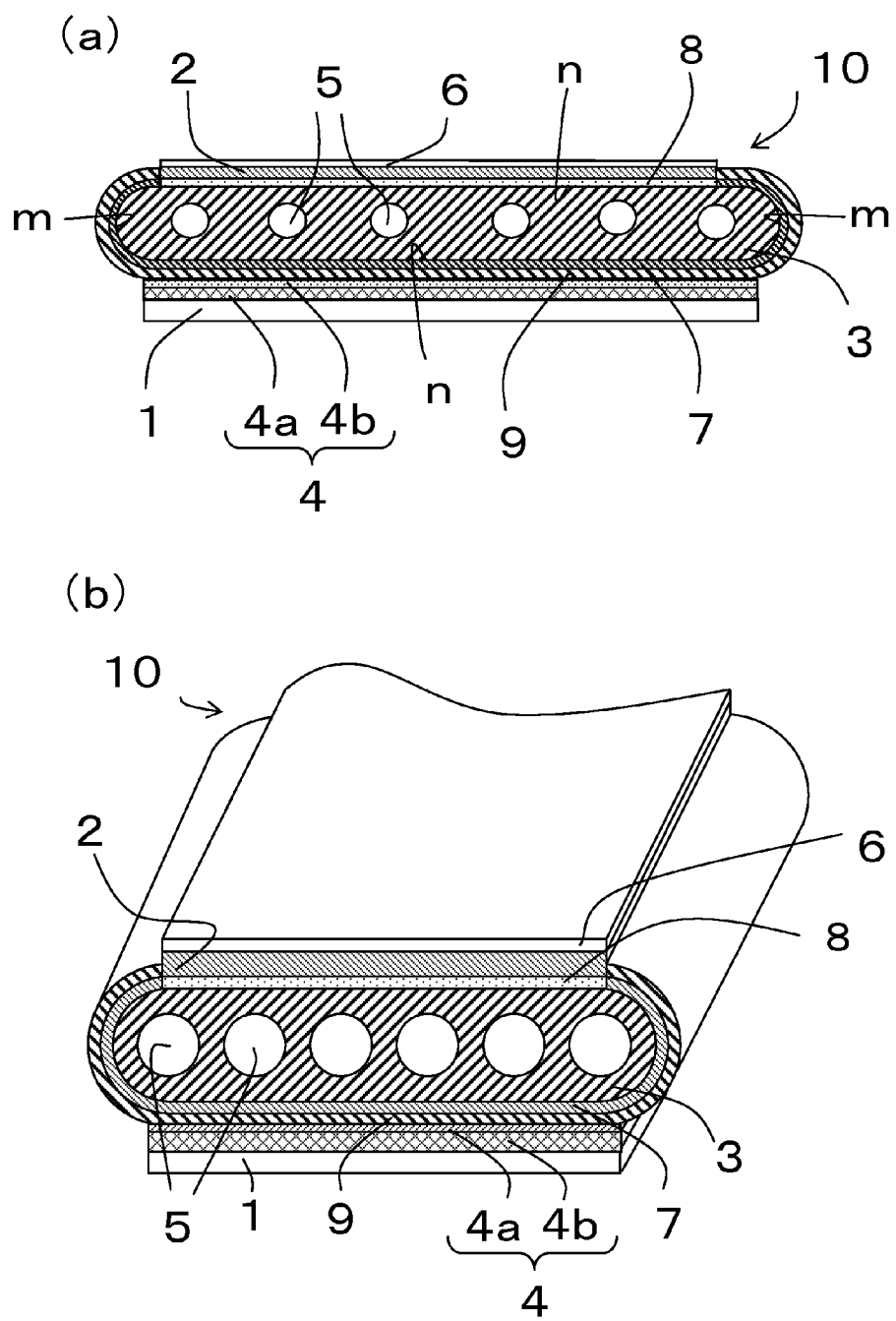
FIG. 1 is a diagram illustrating an embodiment of a fuel cell according to the invention, where FIG. 1(*a*) is a cross-sectional view and FIG. 1(*b*) is a perspective view of a fuel cell of which a part is exploded.

Hereinafter, embodiments of the invention will be described with reference to the accompanying drawings.

FIG. 1(a) is a cross-sectional view of a hollow panel-shaped fuel cell 10, and FIG. 1(b) is a perspective view of the fuel cell of which a part is exploded. In both drawings, members of the fuel cell 10 are partially enlarged or the like. FIG. 2 is an enlarged cross-sectional view illustrating a part of a power generation part of the fuel cell 10 according to the invention.

The fuel cell 10 includes a conductive support substrate 3 having an elliptic cylinder shape as a whole. A plurality of fuel gas flow channels 5 are formed in the length direction at a predetermined interval in the conductive support substrate 3. The fuel cell 10 has a structure in which various members are formed on the conductive support substrate 3.

The conductive support substrate 3 includes a flat part n and arc-like parts m at both ends of the flat part n, as can be understood from the shape shown in FIG. 1(a). Both surfaces of the flat part n are substantially parallel to each other. A fuel electrode layer 7 is disposed to cover one surface (the lower surface) of the flat part n and both arc-like parts m and a solid electrolyte layer 9 which is dense is stacked to cover the fuel electrode layer 7. An air electrode layer 1 is stacked on the solid electrolyte layer 9 to face the fuel electrode layer 7 with an intermediate layer 4 interposed therebetween. An interconnector 2 is formed on the other surface of the flat part n on which the fuel electrode layer 7 and the solid electrolyte layer 9 are not stacked. As can be clearly seen from FIGS. 1(a) and 1(b), the fuel electrode layer 7 and the solid electrolyte layer 9 extend to both sides of the interconnector 2 via the arc-like parts m at both ends so as not to expose the surface of the conductive support substrate 3 to the outside.

Here, in the fuel cell 10, the part of the fuel electrode layer 7 facing (opposing) the air electrode layer 1 serves as a fuel electrode to generate electric power. That is, by causing oxygen-containing gas such as air to flow outside the air electrode layer 1, causing fuel gas (hydrogen-containing gas) to flow in the gas flow channels 5 in the conductive support substrate 3, and heating the fuel cell to a predetermined operation temperature, electric power is generated. Current generated by this power generation is collected by the interconnector 2 bonded to the conductive support substrate 3. Members constituting the fuel cell 10 will be sequentially described below.

The conductive support substrate 3 is preferably formed of, for example, an iron group metal component and a rare-earth element oxide, from the requirements that it should be gas-permeable to transmit fuel gas to the fuel electrode layer 7 and it should be conductive to collect power through the use of the interconnector 2.

Examples of the iron group metal component include iron group metal simple, iron group metal oxide, and alloy or alloy oxide of iron group metal. More specific examples of the iron group metal include Fe, Ni (nickel), and Co. In the invention, any thereof can be used, but the iron group component preferably contains Ni and/or NiO in view of low cost and stability in the fuel gas. A plurality of iron group metal components may be included.

The rare-earth element oxide is used to cause the thermal expansion coefficient of the conductive support substrate 3 to approach the thermal expansion coefficient of the solid electrolyte layer 9. A rare-earth element oxide containing at least one element selected from the group consisting of Y, Lu (lutetium), Yb, Tm (thulium), Er (erbium), Ho (holmium), Dy (dysprosium), Gd, Sm, and Pr (praseodymium) is used in combination with the iron group component. Specific examples of the rare-earth element oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$, and $Y_2O_3$ and $Yb_2O_3$ can be preferably used in that solid solution and reaction with the iron group metal oxide are hardly caused, the thermal expansion coefficients are substantially equal to the thermal expansion coefficient of the solid electrolyte layer 9, and they are low in cost.

In that the conductivity of the conductive support substrate 3 is maintained well and the thermal expansion coefficient is caused to approach that of the solid electrolyte layer 9, the volume ratio after firing-reduction is preferably in the range of 35:65 to 65:35 in terms of iron group metal component:rare-earth element oxide (for example, Ni:$Y_2O_3$) (for example, in the range of 65 to 86 mol % in terms of the mole ratio of iron group metal component/(iron group metal component+Y)). The conductive support substrate 3 may further contain other metal components or oxide components in the range in which necessary characteristics are not damaged.

Since the conductive support substrate 3 needs to have fuel gas permeability, the open porosity is preferably equal to or more than 30% and more preferably in the range of 35% to 50%. The conductivity of the conductive support substrate 3 is preferably equal to or more than 50 S/cm, more preferably equal to or more than 300 S/cm, and still more preferably equal to or more than 440 S/cm.

Figure 2:
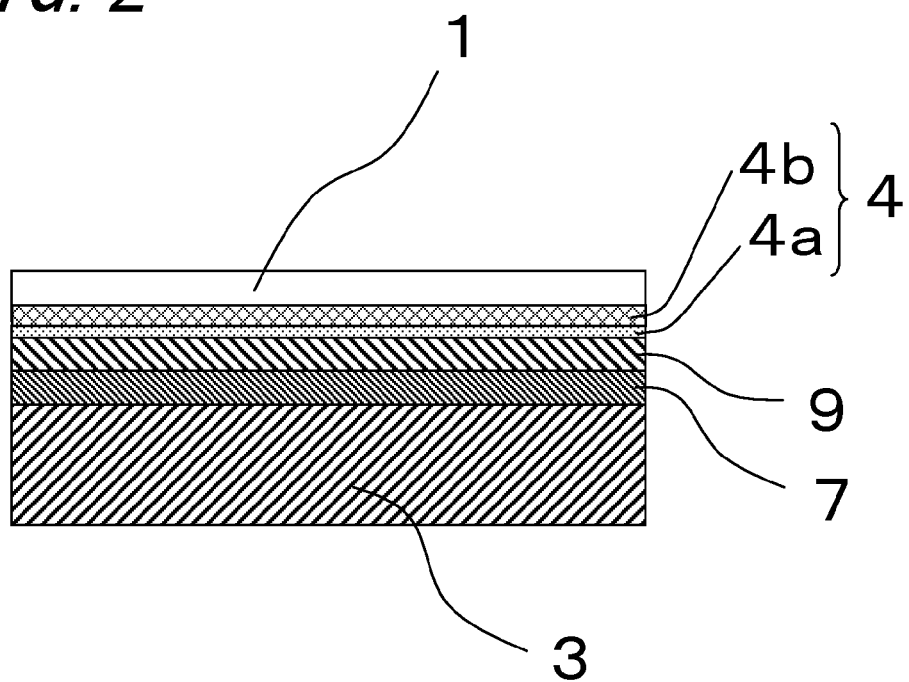
FIG. 2 is an enlarged cross-sectional view illustrating a part of a power generation part in the embodiment of the fuel cell according to the invention.

In the hollow panel-type fuel cell 10 shown in FIG. 1, when the length (the length in the width direction of the conductive support substrate 3) of the flat part n of the conductive support substrate 3 is set to 15 to 35 mm and the length (the length of the arc) of the arc-like part m is set to 2 to 8 mm, the thickness (the thickness between both surfaces of the flat part n) of the conductive support substrate 3 is preferably in the range of 1.5 to 5 mm.

The fuel electrode layer 7 causes an electrode reaction and is preferably formed of known porous conductive ceramics. For example, the fuel electrode layer is formed of $ZrO_2$ solid solution having a rare-earth element excluding Zr or $CeO_2$ solid solution having a rare-earth element excluding Ce, and Ni and/or Nio.

Regarding the content of $ZrO_2$ solid solution having a rare-earth element excluding Zr or $CeO_2$ solid solution having a rare-earth element excluding Ce and the content of Ni or NiO in the fuel electrode layer 7, the volume ratio after firing-reduction is preferably in the range of 35:65 to 65:35 in terms of the volume ratio of Ni:$ZrO_2$ solid solution having a rare-earth element excluding Zr (Ni:YSZ) or $CeO_2$ solid solution having a rare-earth element excluding Ce. The open porosity of the fuel electrode layer 7 is preferably equal to or more than 15% and more preferably in the range of 20% to 40%. The thickness thereof is preferably in the range of 1 to 30 μm. For example, it is possible to enhance the power generation performance by setting the thickness of the fuel electrode layer 7 to the above-mentioned range and it is possible to suppress the separation due to a difference in thermal expansion between the solid electrolyte layer 9 and the fuel electrode layer 7 by setting the thickness to the above-mentioned range.

In the example shown in FIGS. 1(a) and 1(b), since the fuel electrode layer 7 extends to both side surfaces of the interconnector 2 but the fuel electrode layer 7 has only to be formed to exist at a position facing the air electrode layer 1, the fuel electrode layer 7 may be formed, for example, on only the flat part n on the side where the air electrode layer 1 is formed. The interconnector 2 may be formed directly on the flat part n of the conductive support substrate 3 on the side where the solid electrolyte layer 9 is not formed. In this case, it is possible to suppress the potential drop between the interconnector 2 and the conductive support substrate 3.

The solid electrolyte layer 9 formed on the fuel electrode layer 7 is preferably formed of ceramics which is a dense material including partially-stabilized or stabilized $ZrO_2$ containing 3 to 15 mol % of a rare-earth element such as Y (yttrium), Sc (scandium), and Yb (ytterbium). In view of cost, Y can be preferably used as the rare-earth element. In view of prevention of gas permeation, the solid electrolyte layer 9 is preferably formed of a dense material having a relative density (pursuant to Archimedes' principle) of equal to or more than 93% and more preferably equal to or more than 95%. The thickness thereof is preferably in the range of 3 to 50 μm.

The air electrode layer 1 is preferably formed of conductive ceramics composed of so-called $ABO_3$ type perovskite composite oxide. The perovskite composite oxide is preferably transition metal perovskite type oxide, particularly, at least one of $LaMnO_3$-based oxide, $LaFeO_3$-based oxide, and $LaCoO_3$-based oxide in which Sr and La (lanthanum) coexist in the A site. In view of high electric conductivity at an operation temperature of about 600° C. to 1000° C., $LaCoO_3$-based oxide can be preferably used. In the perovskite composite oxide in which Sr and La coexist, Fe (iron) or Mn (manganese) along with Co may exist in the B site.

The air electrode layer 1 needs to have gas permeability and the conductive ceramics (perovskite oxide) forming the air electrode layer 1 preferably has an open porosity of equal to or more than 20% and more preferably in the range of 30% to 50%. The thickness of the air electrode layer 1 is preferably in the range of 30 to 100 μm in view of power collection.

The interconnector 2 is preferably formed of conductive ceramics, but needs to have reduction resistance and oxidation resistance since it comes in contact with fuel gas (hydrogen gas and oxygen-containing gas (air)). Accordingly, lanthanum chromite-based perovskite composite oxide ($LaCrO_3$-based oxide) is generally used as the conductive ceramics having reduction resistance and oxidation resistance. In order to prevent leakage of the fuel gas passing through the inside of the conductive support substrate 3 and the oxygen-containing gas passing through the outside of the conductive support substrate 3, the conductive ceramics has to be dense and preferably has a relative density of equal to or more than 93% and more preferably a relative density of equal to or more than 95%.

The thickness of the interconnector 2 is preferably in the range of 3 to 200 μm, in view of prevention of leakage of gas and suppression of the excessive increase in electric resistance. By setting the thickness to the above-mentioned range, the leakage of gas is hardly caused and the electric resistance is not excessively high, thereby enhancing the power collecting function.

A layer 8 having a composition similar to that of the fuel electrode layer 7 may be formed between the interconnector 2 and the conductive support substrate 3 so as to reduce the difference in thermal expansion coefficient between the interconnector 2 and the conductive support substrate 3. In FIGS. 1(a) and 1(b), the layer 8 having a composition similar to that of the fuel electrode layer 7 is formed between the interconnector 2 and the conductive support substrate 3.

It is preferable that a P-type semiconductor layer 6 is formed on the outer surface (top surface) of the interconnector 2. By connecting a power collecting member to the interconnector 2 via the P-type semiconductor layer 6, the contact thereof is an ohmic contact to reduce the potential drop, thereby effectively avoiding the decrease in power collecting performance.

For example, a layer formed of transition metal perovskite type oxide can be used as the P-type semiconductor layer 6. Specifically, a P-type semiconductor ceramics including a material having larger electron conductivity than that of $LaCrO_3$-based oxide forming the interconnector 2, for example, at least one of $LaMnO_3$-based oxide, $LaFeO_3$-based oxide, and $LaCoO_3$-based oxide in which Mn, Fe, Co, and the like coexist in the B site, can be used. The thickness of the P-type semiconductor layer 6 is preferably in the range of 30 to 100 μm.

An intermediate layer 4 including $CeO_2$ solid solution having a rare-earth element excluding Ce is formed on the surface of the solid electrolyte layer 9. Here, the intermediate layer 4 preferably includes a first layer 4a located on the side of the solid electrolyte layer 9 and a second layer 4b formed on the first layer 4a and located on the side of the air electrode layer 1.

By forming the intermediate layer 4 including $CeO_2$ solid solution having a rare-earth element excluding Ce between the solid electrolyte layer 9 and the air electrode layer 1, it is possible to suppress the diffusion of Zr which is a component of the solid electrolyte layer 9 into the air electrode layer 1, it is possible to suppress the diffusion of Sr or the like which are components of the air electrode layer 1 into the solid electrolyte layer 9, it is possible to suppress the production of a reaction product (reaction layer) having high electric resistance through the reaction thereof, and it is possible to suppress the deterioration in power generation performance at a low temperature of the fuel cell 10 during long-term power generation.

A value obtained by dividing a content of the rare-earth element excluding Ce at a site of the solid electrolyte layer 9, the site being 1 μm away from an interface between the solid electrolyte layer 9 and the intermediate layer 4 (the first layer 4a) by a content of Zr at a site of the solid electrolyte layer 9, the site being 1 μm away from the interface between the solid electrolyte layer 9 and the intermediate layer 4 (the first layer 4a) is set to be equal to or less than 0.05.

The content of the rare-earth element excluding Ce in the intermediate layer 4 (the first layer 4a and the second layer 4b), the content of the rare-earth element excluding Ce and the content of Zr in the solid electrolyte layer 9, and the content of Sr in the air electrode layer 1 can be obtained through the use of quantitative analysis using scanning transmission electron microscope-energy dispersive X-ray spectroscopy (STEM-EDS).

Specifically, a sample is produced using an FIB (Focused Ion Beam)-microsampling method so as to include the air electrode layer 1, the intermediate layer 4, and the solid electrolyte layer 9 of the fuel cell 10, and quantitative analysis using STEM-EDS is performed on the sample. The number of samples may be one or more.

The contents of Zr, Sr, and Ce are obtained through the quantitative analysis. When the interface between the solid electrolyte layer 9 and the intermediate layer 4 (the first layer 4a) is determined by the quantitative analysis, the site satisfying Ce/(Zr—Sr)=1 is determined as the interface between the solid electrolyte layer 9 and the intermediate layer 4 (the first layer 4a). As a method of determining the interface not using the quantitative analysis, a fuel cell is cut and the section thereof is surface-analyzed with an X-ray micro analyzer (EPMA: Electron Probe Micro Analyzer) to confirm the interface. When it is intended to set the value obtained by dividing the content of the rare-earth element excluding Ce by the content of Zr to be equal to or less than 0.05 at the site of the solid electrolyte layer 9, the site being 1 μm away from the interface between the solid electrolyte layer 9 and the intermediate layer 4 (the first layer 4a), the decrease in ionic conductivity in a low temperature range around the interface of the solid electrolyte layer 9 with the intermediate layer 4 can be prevented by reducing the content of the rare-earth element excluding Ce in the intermediate layer 4 (or by causing the intermediate layer 4 not to contain the rare-earth element excluding Ce), thereby providing a fuel cell 10 with improved power generation performance at a low temperature.

More preferably, the value obtained by dividing the content of the rare-earth element excluding Ce at the site of the solid electrolyte layer 9, the site being 0.5 μm away from the interface between the solid electrolyte layer 9 and the intermediate layer 4 (the first layer 4a) by the content of Zr at the site of the solid electrolyte layer 9, the site being 0.5 μm away from the interface between the solid electrolyte layer 9 and the intermediate layer 4 (the first layer 4a) is set to be equal to or less than 0.1. Accordingly, the decrease in ionic conductivity in a low temperature range around the interface of the solid electrolyte layer 9 with the intermediate layer 4 can be further prevented, thereby providing a fuel cell 10 with improved power generation performance.

In producing the second layer 4b of the intermediate layer 4, the source powder preferably has a composition expressed, for example, by $(CeO_2)_{1-x}(REO_{1.5})_x$ (where RE represents at least one of Sm, Y, Yb, and Gd and x is a number satisfying $0<x\le0.3$).

Particularly, $CeO_2$ solid solution having Sm or Gd can be preferably used and the source powder preferably has a composition expressed by $(CeO_2)_{1-x}(SmO_{1.5})_x$ or $(CeO_2)_{1-x}(GdO_{1.5})_x$ (where x is a number satisfying $0<x\le0.3$). In view of a decrease in electric resistance, $CeO_2$ solid solution having 10 to 20 mol % $SmO_{1.5}$ or $GdO_{1.5}$ can be preferably used.

On the other hand, in producing the first layer 4a of the intermediate layer 4, the first layer 4a and the second layer 4b may be formed of the same source powder, but $CeO_2$ not containing a rare-earth element can be preferably used as the source powder, in view of the effective suppression of diffusion of the rare-earth element excluding Ce contained in the second layer 4b or $CeO_2$ solid solution having a rare-earth element excluding Ce into the solid electrolyte layer 9. That is, in the fuel cell 10, the rare-earth element excluding Ce contained in the second layer 4b or $CeO_2$ solid solution having the rare-earth element excluding Ce diffuses into the first layer 4a during production or power generation. Accordingly, when $CeO_2$ solid solution having no rare-earth element is used as the source powder to produce the first layer 4a, the first layer 4a includes $CeO_2$ solid solution having the rare-earth element and $CeO_2$ solid solution having no rare-earth element. For this reason, in this case, in the course of manufacturing the fuel cell 10 or generating electric power, the content of the rare-earth element excluding Ce contained in the first layer 4a can be made to be smaller than the content of the rare-earth element excluding Ce contained in the second layer 4b. Accordingly, it is possible to suppress the particular decrease in ionic conductivity in a low temperature range around the interface of the solid electrolyte layer 9 with the intermediate layer 4 and thus to provide a fuel cell 10 with improved power generation performance at a low temperature.

Since the first layer 4a and the second layer 4b each contain $CeO_2$, it is possible to improve the adhesion strength between the first layer 4a and the second layer 4b and to reduce the thermal expansion coefficient between the first layer 4a and the second layer 4b. Accordingly, since the thermal expansion coefficient of the intermediate layer 4 can be made close to the thermal expansion coefficient of the solid electrolyte layer 9, it is possible to suppress generation of cracks or separation due to the difference in thermal expansion.

It is preferable that the intermediate layer 4 includes the first layer 4a and the second layer 4b and the first layer 4a is denser than the second layer 4b.

Accordingly, even when Sr constituting the air electrode layer 1 permeates the second layer 4b, it is possible to suppress the diffusion of Sr or the like by the use of the denser first layer 4a and to suppress the diffusion of Sr or the like into the solid electrolyte layer 9. Accordingly, in the solid electrolyte layer 9, it is possible to prevent formation of a reaction layer having high electric resistance due to a reaction between Zr in the solid electrolyte layer 9 and Sr or the like in the air electrode layer 1.

The first layer 4a and the second layer 4b, oxide of another rare-earth element (for example, $Y_2O_3$ and $Yb_2O_3$) may be added to the source powder in order to enhance the effect of suppressing the diffusion of Zr in the solid electrolyte layer 9 and to enhance the effect of suppressing the formation of a reaction product between Zr in the solid electrolyte layer 9 and Sr or the like.

Here, it is preferable that the solid electrolyte layer 9 and the first layer 4a are formed by co-firing. That is, the second layer 4b is preferably formed through a separate process after the solid electrolyte layer 9 and the first layer 4a are formed by co-firing.

In this method of producing a fuel cell 10, since the solid electrolyte layer 9 and the first layer 4a are formed at a high temperature by co-firing as described later, Zr of the solid electrolyte layer 9 diffuses into the first layer 4a, the solid electrolyte layer 9 and the first layer 4a can be strongly bonded to each other, separation of the first layer 4a from the solid electrolyte layer 9 can be suppressed, and the first layer 4a can be made to be dense.

The second layer 4b can be made to have a low density by forming the second layer on the surface of the first layer 4a through a process separated from the co-firing. Therefore, for example, when the air electrode layer 1 is formed after the second layer 4b is formed, it is possible to enhance the adhesion strength by an anchor effect. Accordingly, it is possible to suppress the separation of the air electrode layer 1 from the second layer 4b and to suppress the decrease in power generation performance of the fuel cell 10 in long-term power generation. Since the contact area between the second layer 4b and the air electrode layer 1 can increase, it may be possible to lower reaction resistance.

It is possible to lower the rigidity of the second layer 4b by forming the second layer 4b with a low density, it is possible to reduce a thermal stress when the thermal stress is generated due to the difference in thermal expansion from the air electrode layer 1, it is possible to suppress the separation of the air electrode layer 1 from the second layer 4b, and it is possible to suppress the decrease in power generation performance of the fuel cell 10 in long-term power generation.

The second layer 4b has only to have a density lower than that of the first layer 4a and it is not limited to making the second layer 4b denser in order to suppress the diffusion of Sr or the like in the air electrode layer 1 into the solid electrolyte layer 9. Here, it is preferable that the density is appropriately adjusted to form the second layer 4b so as to strongly bond the second layer 4b and the air electrode layer 1 to each other.

The second layer 4b of the intermediate layer 4 may include a plurality of layers. Therefore, for example, the second layer 4b may include two layers and the intermediate layer 4 may include three layers as a whole, or the intermediate layer may include a larger number of layers.

Here, when the second layer 4b includes a plurality of layers, it is preferable that the layer bonded to the air electrode layer 1 is strongly bonded thereto. Accordingly, the second layer 4b can be appropriately formed by separately forming the layer bonded to the air electrode layer 1 after sequentially forming the layers constituting the second layer 4b.

By causing the second layer 4b disposed not to be bonded to the air electrode layer 1 out of the plurality of layers to be denser, it is possible to reduce the grain boundaries or surface area in the second layer 4b and to further suppress the diffusion of Sr or the like contained in the air electrode layer 1 into the solid electrolyte layer 9. In causing the second layer 4b to be denser, the second layer 4b can be made to be denser by appropriately changing the thermal process temperature or the thermal process time of the second layer 4b on the basis of the particle size of the source material of the second layer 4b.

The second layer 4b preferably has a density lower than that of the first layer 4a and thus the second layer is preferably fired at a temperature lower than, for example, the co-firing temperature of the first layer 4a and the solid electrolyte layer 9.

By co-firing the solid electrolyte layer 9 and the first layer 4a and then firing the second layer 4b on the first layer 4a at a temperature lower than the co-firing temperature of the solid electrolyte layer 9 and the first layer 4a, it is possible to suppress the diffusion of Zr in the solid electrolyte layer 9 into the second layer 4b. Accordingly, the second layer 4b does not contain Zr and it is possible to suppress the formation of a reaction layer having high electric resistance in the air electrode layer 1 disposed on the second layer 4b.

By firing and forming the second layer 4b at a temperature lower than the co-firing temperature of the solid electrolyte layer 9 and the first layer 4a, it is possible to lower the denseness of the second layer 4b. Accordingly, it is possible to strongly bond the second layer 4b and the air electrode layer 1 to each other.

When firing the second layer 4b at a temperature lower than the co-firing temperature of the solid electrolyte layer 9 and the first layer 4a, specifically, the second layer is preferably fired at a temperature lower by 200° C. or higher than the co-firing temperature of the solid electrolyte layer 9 and the first layer 4a. Regarding the specific temperature, the second layer 4b is preferably fired and formed, for example, at 1100° C. to 1300° C.

It is preferable that the thickness of the first layer 4a be in the range of 0.5 to 10 μm and the thickness of the second layer 4b be in the range of 1 to 20 μm. By setting the thickness of the first layer 4a to be in the range of 0.5 to 10 μm, it is possible to suppress the diffusion of the rare-earth element excluding Ce contained in the intermediate layer 4 into the solid electrolyte layer 9. Accordingly, it is possible to particularly suppress the decrease in ionic conductivity in the low temperature range around the interface between the solid electrolyte layer 9 and the first layer 4a and thus to provide a fuel cell 10 with improved power generation performance at a low temperature.

By setting the thickness of the first layer 4a to be in the range of 0.5 to 10 μm, it is possible to allow Zr contained in the solid electrolyte layer 9 to satisfactorily diffuse into the first layer 4a to strongly bond the solid electrolyte layer 9 and the first layer 4a to each other and it is possible to suppress the separation of the first layer 4a from the solid electrolyte layer 9.

On the other hand, by setting the thickness of the second layer 4b to be in the range of 1 to 20 μm, it is possible to enhance the bonding strength between the first layer 4a and the second layer 4b and to suppress the separation of the second layer 4b from the first layer 4a. When the thickness of the second layer 4b is larger than 20 μm, the second layer 4b may be separated from the first layer 4a due to the difference in thermal expansion from the first layer 4a.

By setting the thickness of the second layer 4b to be in the range of 1 to 20 μm, it is possible to reduce the amount of Sr in the air electrode layer 1 permeating the second layer 4b due to long-term continuous operation. Accordingly, it is possible to suppress the diffusion of Sr in the air electrode layer 1 into the solid electrolyte layer 9, to suppress the decrease in power generation performance of the fuel cell 10 in the long-term power generation, and thus to provide a fuel cell 10 with excellent long-term reliability.

When the intermediate layer 4 containing $CeO_2$ solid solution having the rare-earth element excluding Ce is formed on the surface of the solid electrolyte layer 9 containing Zr and Y, the power generation performance may be low at a high temperature. Although the cause is not clear, as the result of study of the components of the fuel cell 10, it is thought that a site (peak part) in which the content of Y in the solid electrolyte layer 9 is partially high is present in the site f the solid electrolyte layer 9 within 1 μm from the interface thereof with the intermediate layer 4 and the presence of the site in which the content of Y is high is associated with the low power generation performance at a high temperature.

Accordingly, the value obtained by dividing the maximum content of Y in the site of the solid electrolyte layer 9 within 1 μm from the interface thereof with the intermediate layer 4 (the first layer 4a) by the content of Zr in the site where the maximum content of Y is detected is set to be equal to or less than 0.25. As a result, it is possible to suppress the decrease in power generation performance at a high temperature.

The content of Y or the content of Z in the solid electrolyte layer 9 can be obtained through the use of the quantitative analysis using scanning transmission electron microscope-energy dispersive X-ray spectroscopy (STEM-EDS).

A method of manufacturing the above-mentioned hollow panel-type fuel cell 10 will be described below.

First, a powder of iron group metal such as Ni or oxide thereof, a powder of rare-earth element oxide such as $Y_2O_3$, an organic binder, and a solvent are blended to prepare a green body, a conductive support substrate compact is produced using the green body through the use of an extrusion molding method, and the resultant is dried. A calcined body obtained by calcining the conductive support substrate compact at 900° C. to 1000° C. for 2 to 6 hours may be used as the conductive support substrate compact.

Then, for example, a source material of NiO and $ZrO_2$ solid solution having $Y_2O_3$ (YSZ) in accordance with a predetermined combination composition is weighed and blended thereto. Thereafter, an organic binder and a solvent are blended to prepare a fuel electrode layer slurry.

A toluene, a binder, and a commercially-available dispersant are added to the $ZrO_2$ powder having the rare-earth element excluding Zr to form a slurry and this slurry is shaped with a thickness of 7 to 75 μm through the use of a doctor blade method or the like to produce a sheet-like solid electrolyte layer compact. The fuel electrode layer slurry is applied onto the sheet-like solid electrolyte layer compact to form a fuel electrode layer compact and the surface of the fuel electrode layer compact is stacked on the conductive support substrate compact. The fuel electrode layer slurry may be applied to a predetermined position of the conductive support substrate compact and may be dried and then the solid electrolyte layer compact coated with the fuel electrode layer slurry may be stacked on the conductive support substrate compact.

Then, the intermediate layer 4 is formed. In the formation of the intermediate layer 4, when the first layer 4a and the second layer 4b are formed of the same source powder, it is preferable that an intermediate layer compact to be described later be stacked thereon and then the resultant be co-fired without calcining in advance a stacked body in which the fuel electrode layer compact and the solid electrolyte layer compact are stacked on the conductive support substrate compact. When the first layer 4a and the second layer 4b are formed of different source powders, it is preferable that the stacked body be calcined in advance and then the intermediate layer compact to be described later be stacked thereon.

For example, a powder of $CeO_2$ not containing a rare-earth element or a powder of $CeO_2$ solid solution having $GdO_{1.5}$ or a powder of $CeO_2$ solid solution having $SmO_{1.5}$ is wet-crushed to prepare a source powder for a first layer compact out of the intermediate layer compact 4. The wet crushing is performed, for example, with a ball mill using a solvent for 10 to 20 hours.

Toluene as a solvent is added to the source powder for the first layer compact of which the degree of aggregation is adjusted to prepare a first layer slurry and this slurry is applied to the solid electrolyte layer compact to produce the first layer compact. A sheet-like first layer compact may be produced and then may be stacked on the solid electrolyte layer compact.

Here, when the first layer compact is formed of the $CeO_2$ powder not containing a rare-earth element excluding Ce, it is preferable that the stacked body in which the fuel electrode layer compact and the solid electrolyte layer compact are stacked on the conductive support substrate compact not be calcined in advance. When the first layer compact is formed of the powder of $CeO_2$ solid solution having $GdO_{1.5}$ or the powder of $CeO_2$ solid solution having $SmO_{1.5}$, it is preferable that the stacked body in which the fuel electrode layer compact and the solid electrolyte layer compact are stacked on the conductive support substrate compact be calcined in advance. Accordingly, the value obtained by dividing the content of the rare-earth element excluding Ce by the content of Zr can be set to be equal to or less than 0.05 at the site of the solid electrolyte layer 9, the site being 1 μm away from the interface between the solid electrolyte layer 9 and the intermediate layer 4 and it is possible to suppress the decrease in ionic conductivity in a low temperature range and thus to provide a fuel cell with improved power generation performance at a low temperature.

Subsequently, an interconnector material (for example, a $LaCrO_3$-based oxide powder), an organic binder, and a solvent are blended to prepare a slurry, this slurry is formed in a sheet shape to produce an interconnector sheet, and the interconnector sheet is stacked on the exposed surface of the conductive support substrate compact on which the solid electrolyte layer compact is not formed, whereby a stacked compact is produced.

Then, the stacked compact is subjected to a binder removing process and is fired at 1400° C. to 1600° C. in the atmosphere containing oxygen for 2 to 6 hours.

Subsequently, for example, the powder of $CeO_2$ solid solution having $GdO_{1.5}$ or $SmO_{1.5}$ is heated at 800° C. to 900° C. for 2 to 6 hours, and the resultant is wet-crushed to adjust the degree of aggregation to the range of 5 to 35, whereby the source powder for the second layer compact of the intermediate layer 4 is prepared. The wet crushing is preferably performed, for example, with a ball mill using a solvent for 10 to 20 hours. The same is true when the second layer is formed of the powder of $CeO_2$ solid solution having $SmO_{1.5}$.

Toluene as a solvent is added to the source powder for the second layer compact of which the degree of aggregation is adjusted to prepare a second layer slurry, the second layer slurry is applied to the surface of the first layer 4a formed by sintering to produce the second layer compact, and the second layer compact is fired. In the firing of the second layer compact, the firing temperature is preferably lower by 200° C. or higher than the firing temperature of the solid electrolyte layer 9 and the first layer 4a and is more preferably in the range of 1100° C. to 1300° C. Accordingly, it is possible to suppress the diffusion of Sr or the like in the air electrode layer 1 into the solid electrolyte layer 9.

When the second layer 4b includes a plurality of layers, the layers constituting the second layer 4b can be produced by appropriately adjusting the production method such as by preparing the source powders as described above, adding toluene to the source powders to prepare slurries, and applying and sequentially stacking the slurries, and independently firing the respective layers.

Here, in causing the second layer 4b to be denser, the particle size, the firing temperature, and the firing time, and the like of the source material for the second layer compact can be appropriately adjusted. By firing to fix the second layer 4b and the first layer 4a and then baking the resultant in, the second layer 4b may be made to be denser. When the second layer 4b is made to be denser, the bonding strength to the air electrode layer 1 may be lowered. Accordingly, it is preferable that the baking temperature or the baking time be appropriately adjusted to strongly bond the second layer 4b and the air electrode layer 1 to each other. The firing time for fixing the second layer 4b and the first layer 4a is preferably in the range of 2 to 6 hours.

Then, a slurry including an air electrode layer material (for example, $LaCoO_3$-based oxide powder), a solvent, and a pore-forming agent is applied to the second layer 4b through the use of a dipping method or the like. A slurry including a P-type semiconductor layer material (for example, $LaCoO_3$-based oxide powder) and a solvent is applied to a predetermined position on the interconnector 2 through the use of a dipping method or the like and the resultant is baked in at 1000° C. to 1300° C. for 2 to 6 hours if necessary, whereby it is possible to manufacture the hollow panel-type fuel cell 10 having the structure shown in FIGS. 1(a) and 1(b). Thereafter, it is preferable that hydrogen gas be made to flow in the fuel cell 10 to perform a reduction process on the conductive support substrate 3 and the fuel electrode layer 7. At this time, the reduction process is preferably performed, for example, 750° C. to 1000° for 5 to 20 hours.

That is, since the second layer 4b is baked in and then the air electrode layer 1 is baked in to manufacture the fuel cell 10, it is possible to suppress the diffusion of the components of the air electrode layer 1 into the second layer 4b. Accordingly, it is possible to suppress the diffusion of the components of the air electrode layer 1 into the solid electrolyte layer 9 just after manufacturing the fuel cell 10.

In the manufactured fuel cell 10, the value obtained by dividing the content of the rare-earth element excluding Ce at the site of the solid electrolyte layer 9, the site being 1 μm away from the interface between the solid electrolyte layer 9 and the intermediate layer 4 (the first layer 4a) by the content of Zr at the site of the solid electrolyte layer 9, the site being 1 μm away from the interface between the solid electrolyte layer 9 and the intermediate layer 4 (the first layer 4a) can be set to be equal to or less than 0.05. When the solid electrolyte layer 9 contains Zr and Y, the value obtained by dividing the maximum content of Y in the site of the solid electrolyte layer 9 within 1 μm from the interface thereof with the intermediate layer 4 by the content of Zr in the site where the maximum content of Y is detected can be set to be equal to or less than 0.25.

Figure 3:
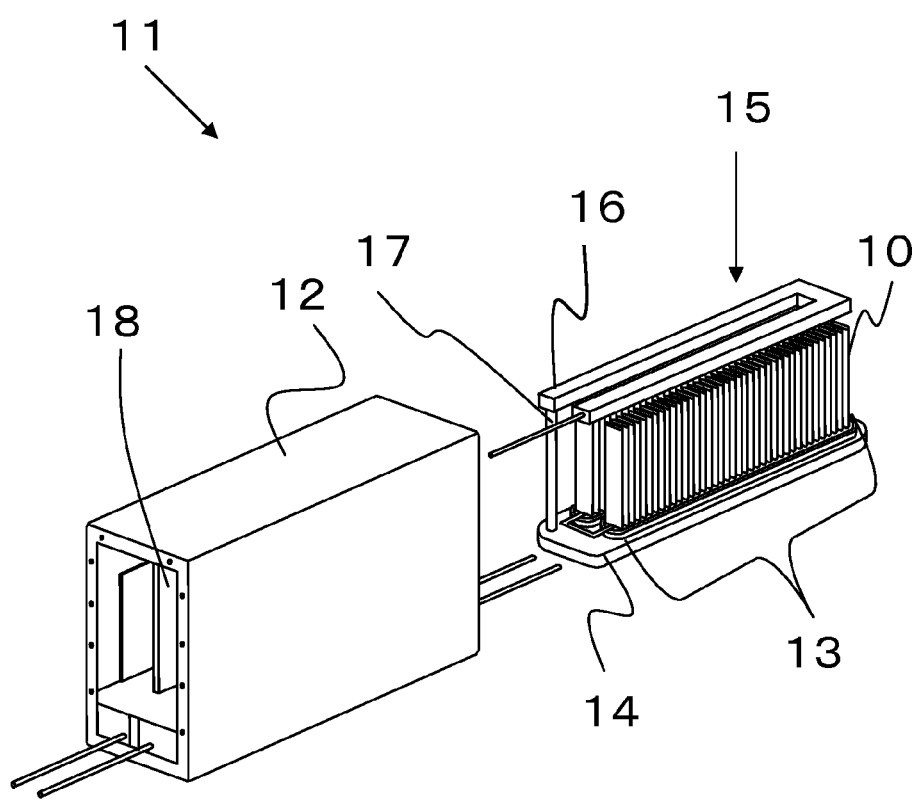
FIG. 3 is a perspective view illustrating the appearance of an embodiment of a fuel cell module including the fuel cell according to the invention.

FIG. 3 is a perspective view illustrating an example of a fuel cell module 11 including a cell stack device 15 including a cell stack 13 and a housing 12 configured to receive the cell stack device 15 therein, the cell stack 13 including a plurality of fuel cells 10 according to the invention and power collecting members (not shown), the plurality of fuel cells being electrically connected in series with power collecting members interposed therebetween.

In order to acquire fuel gas used in the fuel cell 10, a reformer 16 configured to reform a raw material such as natural gas or lamp oil to generate fuel gas is disposed above the cell stack 13. The fuel gas generated by the reformer 16 is supplied to a manifold 14 via a gas flow pipe 17 and is supplied to the fuel gas flow channels 5 formed in the fuel cells 10 via the manifold 14.

Since the cell stack 13 includes a plurality of fuel cells 10 with improved power generation performance at a low temperature which are electrically connected in series, it is possible to provide a cell stack 13 with improved power generation performance at a low temperature.

FIG. 3 shows a state where parts (front and rear walls) of the housing 12 are removed and the cell stack device 15 and the reformer 16 received therein are pulled out backward. Here, in the fuel cell module 11 shown in FIG. 3, the cell stack device 15 can be made to slide and can be received in the housing 12. The cell stack device 15 may include the reformer 16.

An oxygen-containing gas introducing member 18 installed in the housing 12 is disposed between the manifold 14 and the cell stack 13 juxtaposed thereon in FIG. 3 and supplies oxygen-containing gas to the lower end of the fuel cells 10 so that the oxygen-containing gas flows in the side of the fuel cells 10 from the lower end to the upper end with the flow of the fuel gas. By combusting the fuel gas discharged from the fuel gas flow channels 5 of the fuel cells 10 and the oxygen-containing gas at the upper end of the fuel cells 10, it is possible to raise the temperature of the fuel cells 10 and to accelerate the startup of the cell stack device 15. By combusting the fuel gas discharged from the fuel gas flow channels 5 of the fuel cells 10 and the oxygen-containing gas at the upper end of the fuel cells 10, it is possible to warm the reformer 16 disposed above the fuel cells 10 (the cell stack 13). Accordingly, the reformer 16 can efficiently perform a reforming reaction.

Since the fuel cell module 11 according to the invention includes the cell stack device 15 including the cell stack 13 having the fuel cells 10 with improved power generation performance at a low temperature, and the housing 12 configured to receive the cell stack device 15 therein, it is possible to provide a fuel cell module 11 with improved power generation performance at a low temperature.

Figure 4:
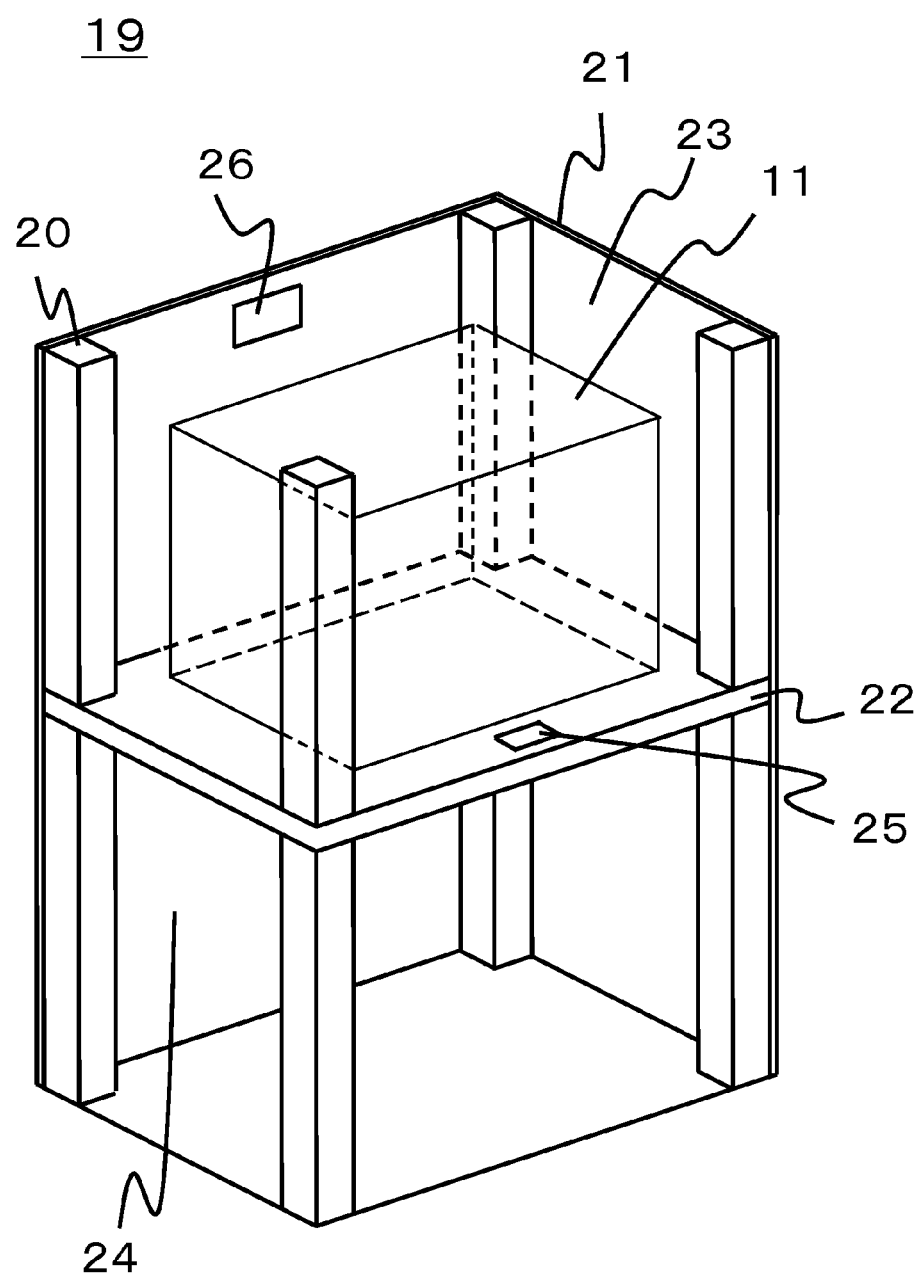
FIG. 4 is an exploded perspective view illustrating an embodiment of a fuel cell device according to the invention of which parts are omitted.

FIG. 4 is an exploded perspective view illustrating an example of a fuel cell device according to the invention including the fuel cell module 11 shown in FIG. 3, an auxiliary device (not shown) used to operate the cell stack 13 (the cell stack device 15), and an exterior case configured to receive the fuel cell module 11 and the auxiliary device therein. In FIG. 4, some parts of the configuration are removed.

In the fuel cell device 19 shown in FIG. 4, an exterior case including columns 20 and exterior plates 21 is partitioned vertically by a partition plate 22, the upside space is defined as a module receiving chamber 23 configured to receive the fuel cell module 11, and the downside space is defined as an auxiliary device receiving chamber 24 configured to receive auxiliary devices used to operate the fuel cell module 11. The auxiliary devices received in the auxiliary device receiving chamber 24 include a water supply unit configured to supply water to the fuel cell module 11 and a supply unit configured to supply the fuel gas and air, but the auxiliary devices are not shown.

An air flow port 25 configured to allow air of the auxiliary device receiving chamber 24 to flow into the module receiving chamber 23 is formed in the partition plate 22 and an exhaust port 26 configured to exhaust air in the module receiving chamber 23 is formed in a part of the exterior plate 21 constituting the module receiving chamber 23.

Since the fuel cell device 19 is configured by receiving the fuel cell module 11 with improved power generation performance at a low temperature in the module receiving chamber 23 as described above, it is possible to provide a fuel cell device 19 with improved power generation performance at a low temperature.

While the invention has been described in detail, the invention is not limited to the above-mentioned embodiment but may be modified and improved in various forms without departing from the concept of the invention.

For example, although the hollow panel-type fuel cell including the conductive support substrate 3 has been described as an example of the fuel cell 10 according to the invention, a panel-type fuel cell not including the conductive support substrate 3 or a cylindrical fuel cell may be used. A fuel cell in which the air electrode layer 1, the solid electrolyte layer 9, the intermediate layer 4, and the fuel electrode layer 7 are stacked in this order on the conductive support substrate 3 may be used depending on the configuration of the respective fuel cells.

EXAMPLES

Example 1

An example where the second layer is formed of a single layer will be described below.

First, a green body produced by blending an NiO powder with an average particle size of 0.5 μm and an $Y_2O_3$ powder with an average particle size of 0.9 μm so that the volume ratio of Ni is 48 vol % and the volume ratio of $Y_2O_3$ is 52 vol % in terms of the volume ratio after firing-reduction and adding an organic binder and a solvent thereto was molded through the use of an extrusion molding method and the resultant was dried and degreased to produce a conductive support substrate compact. In Sample No. 1, the volume ratio of Ni was 45 vol % and the volume ratio of $Y_2O_3$ was 55 vol % in terms of the volume ratio after firing-reduction of the $Y_2O_3$ powder.

Then, a fuel electrode layer slurry in which an NiO powder with an average particle size of 0.5 μm, a powder of $ZrO_2$ solid solution having $Y_2O_3$, an organic binder, and a solvent were blended was produced, the fuel electrode layer slurry was applied to the conductive support substrate compact through the use of a screen printing method, and the resultant was dried, whereby a coating layer for the fuel electrode layer was formed. Then, a solid electrolyte layer sheet with a thickness of 30 µm was produced through the use of a doctor blade method using a slurry obtained by blending a powder of $ZrO_2$ solid solution having 8 mol % yttria ($Y_2O_3$) and having a particle size of 0.8 µm based on a Microtrac method (solid electrolyte layer source powder), an organic binder, and a solvent. The solid electrolyte layer sheet was bonded to the coating layer for the fuel electrode layer and was dried, whereby the stacked compact shown in Table 1 was produced. The particle size of the $ZrO_2$ powder in Sample No. 3 was 1.0 µm and the thickness of the solid electrolyte layer sheet in Sample No. 4 was 40 µm.

Subsequently, Sample Nos. 1 to 11 and Sample Nos. 19 to 23 shown in Table 1 were calcined at 1000° C. for 3 hours. In Sample Nos. 12 to 14 shown in Table 1, the stacked compacts were not calcined.

Then, $CeO_2$ was crushed with a vibration mill or a ball mill using isopropyl alcohol (IPA) as a solvent, whereby a source powder for the first layer compact was obtained. A composite oxide including 85 mol % of $CeO_2$ and 15 mol % of any one of other rare-earth element oxides ($SmO_{1.5}$, $YO_{1.5}$, $YbO_{1.5}$, and $GdO_{1.5}$) was crushed with a vibration mill or a ball mill using isopropyl alcohol (IPA) as a solvent, the resultant was calcined at 900° C. for 4 hours, and the resultant was crushed again with a ball mill to adjust the degree of aggregation, whereby a source powder for the first layer compact was obtained.

Subsequently, a first layer slurry obtained by adding an acryl-based binder and toluene to the source powders for the first layer compact and blending the resultant was applied to the solid electrolyte layer calcined body of the obtained stacked calcined body or the solid electrolyte layer compact of the stacked compact through the use of a screen printing method, whereby a first layer compact was produced.

Subsequently, an interconnector slurry in which an $LaCrO_3$-based oxide, an organic binder, and a solvent were blended was prepared, was stacked on the exposed conductive support substrate calcined body or conductive support substrate compact not having the solid electrolyte layer calcined body or solid electrolyte layer compact formed thereon, and was fired in the atmosphere at 1510° C. for 3 hours.

Then, a composite oxide including 85 mol % of $CeO_2$ and 15 mol % of any one of other rare-earth element oxides ($SmO_{1.5}$, $YO_{1.5}$, $YbO_{1.5}$, and $GdO_{1.5}$) was crushed with a vibration mill or a ball mill using isopropyl alcohol (IPA) as a solvent, the resultant was calcined at 900° C. for 4 hours, and the resultant was crushed again with a ball mill to adjust the degree of aggregation, whereby a source powder for the second layer compact was obtained. A second layer slurry prepared by adding an acryl-based binder and toluene to the source powder for the second layer compact and blending the resultant was applied to the surface of the first layer 4a formed by firing through the use of a screen printing method to form a second layer compact film, and the resultant was fired at the temperature shown in Table 1 for 3 hours.

Sample Nos. 15 to 18 shown in Table 1 were formed by firing the stacked compact without forming the first layer, stacking only the second layer, and firing the resultant. In Sample No. 19, the second layer was not formed. In Sample Nos. 1 to 14 and Sample Nos. 20 to 23 having the first layer and the second layer formed thereon, the first layer was denser than the second layer by firing the second layer at a temperature lower than the firing temperature of the first layer. The denseness of the first layer and the second layer can be evaluated using the relative density based on an Archimedes' method and the relative density of the first layer was set to be higher than the relative density of the second layer.

Thereafter, a broken-out section was observed by the use of a scanning electron microscope and the separation of the first layer and the solid electrolyte layer was checked. The thicknesses of the first layer and the second layer were measured and described in Table 1.

Regarding the fixing strength between the second layer and the solid electrolyte layer or the first layer, the absence of fixing strength was determined when the separation was caused by rubbing the resultant with a finger or processing the resultant with an ultrasonic cleaner, and the presence of fixing strength was determined when the separation was not caused in any case.

A mixture solution including a $La_{0.6}Sr_{0.4}Co_{0.2}Fe_{0.8}O_3$ powder with an average particle size of 2 µm and isopropyl alcohol was prepared, the mixture solution was sprayed and applied to the surface of the second layer of a stacked sintered compact to form an air electrode layer compact, the resultant was baked in at 1100° C. for 4 hours to form an air electrode layer, whereby the fuel cell shown in FIGS. 1(a) and 1(b) was produced.

The size of the produced fuel cell was 25 mm×200 mm, the thickness of the conductive support substrate (the distance between both surfaces of the flat part n) was 2 mm, the open porosity thereof was 35%, the thickness of the fuel electrode layer was 10 µm, the open porosity thereof was 24%, the thickness of the air electrode layer was 50 µm, the porosity thereof is 40%, and the relative density is 97%.

Hydrogen-containing gas was made to flow in the fuel cell and a reduction process was performed on the conductive support substrate and the fuel electrode layer at 850° C. for 10 hours.

In the obtained fuel cell, the contents of the rare-earth element excluding Ce in the first layer and the second layer, the contents of the rare-earth element excluding Ce in the intermediate layer at the sites of the solid electrolyte layer, the sites being 1 µm and 0.5 µm away from the interface between the solid electrolyte layer and the intermediate layer (the first layer or the second layer), and the content of Zr were measured through the use of the STEM-EDS (quantitative analysis using scanning transmission electron microscope-energy dispersive X-ray spectroscopy) quantitative analysis, and the comparison results of the contents of the rare-earth element excluding Ce in the first layer and the second layer and the values obtained by dividing the contents of the rare-earth element excluding Ce in the respective sites of the solid electrolyte layer by the content of Zr are shown in Table 1. By causing the sample thickness to be substantially uniform in about 50 nm through the use of the FIB-micro sampling method during the preparation of the STEM sample, the quantitative error was suppressed.

In the obtained fuel cell, the diffusion of Zr in the solid electrolyte layer into the intermediate layer (the first layer and the second layer) and the diffusion of Sr in the air electrode layer into the solid electrolyte layer were surface-analyzed with an EPMA (X-ray micro analyzer) and are described as presence or absence of Zr and Sr in Table 1.

Regarding the presence and absence of Zr and Sr, the absence was determined when Zr was not present in the first layer and the second layer or when Sr was not present in the solid electrolyte layer, whereas the presence was determined when Zr or Sr was present therein.

Subsequently, fuel gas was made to flow in the fuel gas flow channels of the obtained fuel cell, oxygen-containing gas was made to flow outside the fuel cell, the fuel cell was heated to 600° C. by the use of an electric furnace, the fuel cell was subjected to a power generation test for 3 hours under the conditions of a fuel utilization of 75% and a current density of 0.3 A/cm², and the power generation performance (voltage) of the fuel cell at 600° C. was checked. The result was shown in Table 1.

Thereafter, the fuel cell was heated to 750° C. by the use of an electric furnace and was allowed to generate power for 1000 hours under the conditions of a fuel utilization of 75% and a current density of 0.6 A/cm². At this time, the voltage after 1000 hours was measured using the value at a power generation time of 0 as an initial voltage, and the variation from the initial voltage was calculated as a decay rate, and the decay rate of the power generation performance was calculated.

Regarding the evaluation of deterioration in power generation performance, the decay rate of less than 0.5% was evaluated as extremely small, the decay rate of 0.5% to 1% was evaluated as pretty small, the decay rate of 1% to 3% was evaluated as small, the decay rate of 3% to 5% was evaluated as large, and the decay rate of equal to or more than 5% was evaluated as intense. The evaluation results are shown in Table 1.

TABLE 1

| | Intermediate layer | | | | | | | |
|---|---|---|---|---|---|---|---|---|
| | First layer | | | Second layer | | | | |
| Sample No. | Source composition | Thickness (μm) | Presence of Zr | Source composition | Thickness (μm) | Baking temperature | Presence of Zr | Fixing strength |
| 1 | $CeO_2$ | 0.5 | Present | $CeO_2(SmO_{1.5})$ | 10 | 1100 | Absent | Present |
| 2 | $CeO_2$ | 1 | Present | $CeO_2(SmO_{1.5})$ | 10 | 1200 | Absent | Present |
| 3 | $CeO_2$ | 5 | Present | $CeO_2(SmO_{1.5})$ | 15 | 1300 | Absent | Present |
| 4 | $CeO_2$ | 5 | Present | $CeO_2(SmO_{1.5})$ | 20 | 1300 | Absent | Present |
| 5 | $CeO_2$ | 5 | Present | $CeO_2(YO_{1.5})$ | 10 | 1300 | Absent | Present |
| 6 | $CeO_2$ | 5 | Present | $CeO_2(YbO_{1.5})$ | 5 | 1300 | Absent | Present |
| 7 | $CeO_2$ | 10 | Present | $CeO_2(GdO_{1.5})$ | 30 | 1300 | Absent | Present |
| 8 | $CeO_2$ | 1 | Present | $CeO_2(GdO_{1.5})$ | 1 | 1300 | Absent | Present |
| 9 | $CeO_2$ | 5 | Present | $CeO_2(GdO_{1.5})$ | 10 | 1300 | Absent | Present |
| 10 | $CeO_2$ | 5 | Present | $CeO_2(GdO_{1.5})$ | 5 | 1400 | Present | Present |
| 11 | $CeO_2$ | 5 | Present | $CeO_2(GdO_{1.5})$ | 5 | 1500 | Present | Present |
| 12 | $CeO_2$ | 1 | Present | $CeO_2(GdO_{1.5})$ | 10 | 1400 | Present | Present |
| 13 | $CeO_2(GdO_{1.5})$ | 1 | Present | $CeO_2(GdO_{1.5})$ | 10 | 1400 | Present | Present |
| 14 | $CeO_2(GdO_{1.5})$ | 5 | Present | $CeO_2(GdO_{1.5})$ | 10 | 1400 | Present | Present |
| *15 | — | — | — | $CeO_2(SmO_{1.5})$ | 10 | 1200 | Present | Absent |
| *16 | — | — | — | $CeO_2(SmO_{1.5})$ | 10 | 1300 | Present | Absent |
| *17 | — | — | — | $CeO_2(SmO_{1.5})$ | 10 | 1400 | Present | Present |
| *18 | — | — | — | $CeO_2(SmO_{1.5})$ | 10 | 1500 | Present | Present |
| *19 | $CeO_2(SmO_{1.5})$ | 5 | Present | — | — | — | — | — |
| *20 | $CeO_2(GdO_{1.5})$ | 5 | Present | $CeO_2(GdO_{1.5})$ | 10 | 1100 | Absent | Present |
| *21 | $CeO_2(GdO_{1.5})$ | 5 | Present | $CeO_2(GdO_{1.5})$ | 20 | 1200 | Absent | Present |
| *22 | $CeO_2(GdO_{1.5})$ | 5 | Present | $CeO_2(GdO_{1.5})$ | 5 | 1300 | Absent | Present |
| *23 | $CeO_2(GdO_{1.5})$ | 1 | Present | $CeO_2(GdO_{1.5})$ | 10 | 1300 | Absent | Present |

| Sample No. | Presence of Sr in solid electrolyte layer | Ratio of rare-earth element excluding Ce, and Zr at site of solid electrolyte layer, the site being 1 μm away from interface between solid electrolyte layer and intermediate layer | Ratio of rare-earth element excluding Ce, and Zr at site of solid electrolyte layer, the site being 0.5 μm away from interface between solid electrolyte layer and intermediate layer | Power generation performance | | |
|---|---|---|---|---|---|---|
| | | | | Voltage at 600° C. (mV) | Decay rate (%) | Evaluation |
| 1 | Absent | 0.004 | 0.004 | 734 | 0.4%/1000 h | Extremely small |
| 2 | Absent | 0.006 | 0.006 | 720 | 0.4%/1000 h | Extremely small |
| 3 | Absent | 0.018 | 0.023 | 680 | 0.3%/1000 h | Extremely small |
| 4 | Absent | 0.019 | 0.025 | 677 | 0.4%/1000 h | Extremely small |
| 5 | Absent | 0.016 | 0.02 | 682 | 0.3%/1000 h | Extremely small |
| 6 | Absent | 0.015 | 0.02 | 684 | 0.3%/1000 h | Extremely small |
| 7 | Absent | 0.02 | 0.03 | 676 | 0.7%/1000 h | Pretty small |
| 8 | Absent | 0.01 | 0.02 | 710 | 0.8%/1000 h | Pretty small |
| 9 | Absent | 0.03 | 0.05 | 659 | 0.7%/1000 h | Pretty small |
| 10 | Absent | 0.026 | 0.04 | 668 | 3.1%/1000 h | Large |
| 11 | Absent | 0.04 | 0.07 | 655 | 3.2%/1000 h | Large |
| 12 | Absent | 0.004 | 0.004 | 612 | 3.3%/1000 h | Large |
| 13 | Absent | 0.005 | 0.045 | 608 | 3.1%/1000 h | Large |
| 14 | Absent | 0.013 | 0.029 | 602 | 3.4%/1000 h | Large |
| *15 | Absent | 0.06 | 0.11 | 254 | 6%/1000 h | Intense |
| *16 | Absent | 0.07 | 0.12 | 267 | 6%/1000 h | Intense |

TABLE 1-continued

| *17 | Present | 0.08 | 0.13 | 398 | 5%/1000 h | Intense |
|---|---|---|---|---|---|---|
| *18 | Present | 0.09 | 0.14 | 347 | 5%/1000 h | Intense |
| *19 | Present | 0.09 | 0.15 | 252 | 5%/1000 h | Intense |
| *20 | Absent | 0.06 | 0.11 | 542 | 0.3%/1000 h | Extremely small |
| *21 | Absent | 0.07 | 0.12 | 530 | 0.2%/1000 h | Extremely small |
| *22 | Absent | 0.1 | 0.16 | 541 | 0.4%/1000 h | Extremely small |
| *23 | Absent | 0.06 | 0.11 | 548 | 0.4%/1000 h | Extremely small |

Asterisk (*) represents out of the range of the invention

From the results shown in Table 1, in Sample Nos. 1 to 12 in which the intermediate layer was formed using $CeO_2$ solid solution having a rare-earth element excluding Ce as the source powder of the first layer and using $CeO_2$ ($CeO_2$ solid solution having no rare-earth element) as the source powder of the second layer, it can be seen that the value obtained by dividing the content of the rare-earth element excluding Ce in the intermediate layer by the content of Zr was equal to or less than 0.05 at the site of the solid electrolyte layer, the site being 1 μm away from the interface between the solid electrolyte layer and the intermediate layer, the value obtained by dividing the content of the rare-earth element excluding Ce in the intermediate layer by the content of Zr was equal to or less than 0.1 at the site of the solid electrolyte layer, the site being 0.5 μm away from the interface between the solid electrolyte layer and the intermediate layer, the voltage at 600° C. (mV) was equal to or more than 650 mV, and the power generation performance at a low temperature was improved.

In Sample Nos. 20 to 23 produced by forming the intermediate layer using the powder of $CeO_2$ solid solution having the rare-earth element excluding Ce as the source powder of the first layer and the second layer after stacking the solid electrolyte layer compact on the conductive support substrate compact and calcining the resultant, the diffusion of the rare-earth element excluding Ce was equal to or more than 0.06 at the site of the solid electrolyte layer, the site being 1 μm away from the interface between the solid electrolyte layer and the intermediate layer. However, in Sample Nos. 13 and 14 produced by stacking the solid electrolyte layer compact on the conductive support substrate compact and forming the intermediate layer without calcining using the powder of $CeO_2$ solid solution having the rare-earth element excluding Ce as the source powder of the first layer and the second layer, the diffusion of the rare-earth element excluding Ce was equal to or less than 0.02 at the site of the solid electrolyte layer, the site being 1 μm away from the interface between the solid electrolyte layer and the intermediate layer.

When the first layer and the solid electrolyte layer were co-fired and the second layer was fired at a temperature lower by 200° C. or higher than the co-firing temperature of the first layer and the solid electrolyte layer (Samples Nos. 1 to 9), it can be seen that Zr did not diffuse into the second layer, the fixing strength of the second layer was superior, Sr which is the component of the air electrode layer 1 is not contained in the solid electrolyte layer, and the deterioration in power generation performance was very small.

When the first layer and the second layer were made to be thicker or thinner (Sample Nos. 7 to 9), it can be seen that Zr did not diffuse into the second layer, the fixing strength of the second layer was superior, Sr which is the component of the air electrode layer 1 was not contained in the solid electrolyte layer, and the deterioration in power generation performance was very small.

On the other hand, when the first layer was co-fired but the second layer was fired at a temperature equal to or higher than 1400° C., that is, when the firing temperature of the second layer was lower than the co-firing temperature but the temperature difference was lower than 200° C. (Sample Nos. 10 and 11), it can be seen that Sr which was the component of the air electrode layer 1 was not contained in the solid electrolyte layer, the fixing strength of the second layer was superior, and the voltage at 600° C. (mV) was equal to or higher than 650 mV, but the diffusion of Zr into the second layer appears and thus the deterioration in power generation performance was large.

When the second layer was stacked on the sintered body without the first layer (Sample Nos. 15 to 18) or when the second layer was not formed (Sample No. 19), it can be seen that the value obtained by dividing the content of the rare-earth element excluding Ce in the intermediate layer by the content of Zr was more than 0.05 at the site of the solid electrolyte layer, the site being 1 μm away from the interface between the solid electrolyte layer and the intermediate layer, the value obtained by dividing the content of the rare-earth element excluding Ce in the intermediate layer by the content of Zr was more than 0.1 at the site of the solid electrolyte layer, the site being 0.5 μm away from the interface between the solid electrolyte layer and the first layer, the voltage at 600° C. (mV) was less than 650 mV, the power generation performance at a low temperature was lowered, and the deterioration in power generation performance was intense. In Sample Nos. 17 and 18, the fixing strength was present, but this is because the fixing strength was enhanced due to Zr in the solid electrolyte layer and Zr diffusing into the second layer.

In Sample Nos. 20 to 23 produced by forming the intermediate layer using the powder of $CeO_2$ solid solution having the rare-earth element excluding Ce as the source powder of the first layer and the second layer after stacking the solid electrolyte layer compact on the conductive support substrate compact and calcining the resultant, it can be seen that Zr did not diffuse into the second layer, the fixing strength of the second layer was superior, Sr which was the component of the air electrode layer was not contained in the solid electrolyte layer, and the deterioration in power generation performance was pretty small, but that the value obtained by dividing the content of the rare-earth element excluding Ce in the intermediate layer by the content of Zr was more than 0.05 at the site of the solid electrolyte layer, the site being 1 μm away from the interface between the solid electrolyte layer and the intermediate layer, the value obtained by dividing the content of the rare-earth element excluding Ce in the intermediate layer by the content of Zr was more than 0.1 at the site of the solid electrolyte layer, the site being 0.5 μm away from the interface between the solid electrolyte layer and the first layer, the voltage at 600° C. (mV) was equal to or less than 600 mV, and the power generation performance at a low temperature was lowered.

Example 2

First, a green body produced by blending an NiO powder with an average particle size of 0.5 μm and an $Y_2O_3$ powder with an average particle size of 0.9 μm so that the volume ratio of Ni is 48 vol % and the volume ratio of $Y_2O_3$ is 52 vol % in terms of the volume ratio after firing-reduction and adding an organic binder and a solvent thereto was molded through the use of an extrusion molding method and the resultant was dried and degreased to produce a conductive support substrate compact. In Sample No. 1, the volume ratio of Ni was 45 vol % and the volume ratio of $Y_2O_3$ was 55 vol % in terms of the volume ratio after firing-reduction of the $Y_2O_3$ powder.

Then, a fuel electrode layer slurry in which an NiO powder with an average particle size of 0.5 μm, a powder of $ZrO_2$ solid solution having $Y_2O_3$, an organic binder, and a solvent were blended is produced, the fuel electrode layer slurry was applied to the conductive support substrate compact through the use of a screen printing method, and the resultant was dried, whereby a coating layer for the fuel electrode layer was formed. Then, a solid electrolyte layer sheet with a thickness of 30 μm was produced through the use of a doctor blade method using a slurry obtained by blending a powder of $ZrO_2$ solid solution having 8 mol % yttria ($Y_2O_3$) and having a particle size of 0.8 μm based on a Microtrac method (solid electrolyte layer source powder), an organic binder, and a solvent. The solid electrolyte layer sheet was bonded to the coating layer for the fuel electrode layer and was dried. The particle size of the $ZrO_2$ powder in Sample No. 3 was 1.0 μm and the thickness of the solid electrolyte layer sheet in Sample No. 4 was 40 μm.

Subsequently, in Sample Nos. 1 to 20 shown in Table 2, the compacts were stacked to produce a stacked compact as described above and the resultant was calcined at 1000° C. for 3 hours. In Sample Nos. 21 to 23 shown in Table 2, the stacked compact was not calcined.

Then, $CeO_2$ was crushed with a vibration mill or a ball mill using isopropyl alcohol (IPA) as a solvent, whereby a source powder for the first layer compact was obtained. A composite oxide including 85 mol % of $CeO_2$ and 15 mol % of any one of other rare-earth element oxides ($SmO_{1.5}$, $YO_{1.5}$, $YbO_{1.5}$, and $GdO_{1.5}$) was crushed with a vibration mill or a ball mill using isopropyl alcohol (IPA) as a solvent, the resultant was calcined at 900° C. for 4 hours, and the resultant was crushed again with a ball mill to adjust the degree of aggregation, whereby a source powder for the first layer compact was obtained.

Subsequently, a first layer slurry obtained by adding an acryl-based binder and toluene to the powder and blending the resultant was applied to the solid electrolyte layer calcined body of the obtained stacked calcined body through the use of a screen printing method, whereby a first layer compact was produced.

Subsequently, an interconnector slurry in which an $LaCrO_3$-based oxide, an organic binder, and a solvent were blended was prepared, was stacked on the exposed conductive support substrate calcined body not having the solid electrolyte layer calcined body formed thereon, and was fired in the atmosphere at 1510° C. for 3 hours.

Then, a composite oxide including 85 mol % of $CeO_2$ and 15 mol % of any one of other rare-earth element oxides ($SmO_{1.5}$, $YO_{15}$) $YbO_{1.5}$, and $GdO_{1.5}$) was crushed with a vibration mill or a ball mill using isopropyl alcohol (IPA) as a solvent, the resultant was calcined at 900° C. for 4 hours, and the resultant was crushed again with a ball mill to adjust the degree of aggregation, whereby a source powder for the second layer compact was obtained. An intermediate layer slurry prepared by adding an acryl-based binder and toluene to the powder and blending the resultant was applied to the surface of the formed first layer sintered body through the use of a screen printing method to form a second layer compact film, and the resultant was fired at the temperature shown in Table 2 for 3 hours.

Sample Nos. 12 to 15 shown in Table 2 were formed by firing the stacked compact without forming the first layer and firing only the second layer through a separate process. In Sample No. 16, the second layer was not formed. In Sample Nos. 1 to 11 and Sample Nos. 17 to 22 having the first layer and the second layer formed thereon, the first layer was denser than the second layer.

Thereafter, a section was observed by the use of a scanning electron microscope and the separation of the first layer and the solid electrolyte layer was checked. The thicknesses of the first layer and the second layer were measured and are described in Table 2.

Regarding the fixing strength between the second layer and the solid electrolyte layer or the first layer, the absence of fixing strength was determined when the separation was caused by rubbing the resultant with a finger or processing the resultant with an ultrasonic cleaner, and the presence of fixing strength was determined when the separation was not caused in any case.

A mixture solution including a $La_{0.6}Sr_{0.4}Co_{0.2}Fe_{0.8}O_3$ powder with an average particle size of 2 μm and isopropyl alcohol was prepared, the mixture solution was sprayed and applied to the surface of the second layer of a stacked sintered compact to form an air electrode layer compact, the resultant was baked in at 1100° C. for 4 hours to form an air electrode layer, whereby the fuel cell shown in FIGS. 1(a) and 1(b) was produced.

The size of the produced fuel cell was 25 mm×200 mm, the thickness of the conductive support substrate (the distance between both surfaces of the flat part n) was 2 mm, the open porosity thereof was 35%, the thickness of the fuel electrode layer was 10 μm, the open porosity thereof was 24%, the thickness of the air electrode layer was 50 μm, the porosity thereof was 40%, and the relative density was 97%.

Hydrogen-containing gas was made to flow in the fuel cell and a reduction process was performed on the conductive support substrate and the fuel electrode layer at 850° C. for 10 hours.

In the obtained fuel cell, the maximum content of Y in the site of the solid electrolyte layer within 1 μm from the interface thereof with the intermediate layer and the content of Zr in the site where the maximum content of Y was detected were measured through the use of the STEM-EDS (quantitative analysis using scanning transmission electron microscope-energy dispersive X-ray spectroscopy) quantitative analysis, and the comparison results of the contents of the rare-earth element excluding Ce in the first layer and the second layer and the values obtained by dividing the contents of the rare-earth element excluding Ce in the respective sites of the solid electrolyte layer by the content of Zr are shown in Table 2. The ratio of Y and Zr in the site where the maximum content of Y was detected in the table means the ratio of the maximum content of Y in the site where the maximum content of Y was detected in the site of the solid electrolyte layer within 1 μm from the interface thereof with the intermediate layer and the content of Zr in the site where the maximum content of Y was detected.

The contents of the rare-earth element excluding Ce in the first layer and the second layer, the contents of the rare-earth element excluding Ce in the intermediate layer at the sites of the solid electrolyte layer, the site being 1 μm and 0.5 μm away from the interface between the solid electrolyte layer and the intermediate layer (the first layer or the second layer), and the content of Zr were measured in the same way, and the comparison results of the contents of the rare-earth element excluding Ce in the first layer and the second layer and the values obtained by dividing the contents of the rare-earth element excluding Ce in the respective sites of the solid electrolyte layer by the content of Zr are shown in Table 2. The ratio of the rare-earth element excluding Ce and Zr at the site of the solid electrolyte layer, the site being 0.5 μm away from the interface between the solid electrolyte layer and the intermediate layer means the ratio of Y and Zr contained at the site of the solid electrolyte layer, the site being 0.5 μm away from the interface between the solid electrolyte layer and the intermediate layer.

By causing the sample thickness to be substantially uniform in about 50 nm through the use of the FIB-micro sampling method during the preparation of the STEM sample, the quantitative error was suppressed.

In the obtained fuel cell, the diffusion of Zr in the solid electrolyte layer into the intermediate layer (the first layer and the second layer) and the diffusion of Sr in the air electrode layer into the solid electrolyte layer were surface-analyzed with an EPMA (X-ray micro analyzer) and are described as presence or absence of Zr and Sr in Table 2.

Regarding the presence and absence of Zr and Sr, the absence was determined when Zr was not present in the first layer and the second layer or when Sr was not present in the solid electrolyte layer, and the presence was determined when Zr or Sr was present therein.

Subsequently, fuel gas was made to flow in the fuel gas flow channels of the obtained fuel cell, oxygen-containing gas was made to flow outside the fuel cell, the fuel cell was heated to 600° C. by the use of an electric furnace, the fuel cell was subjected to a power generation test for 3 hours under the conditions of a fuel utilization of 75% and a current density of 0.3 A/cm$^2$, and the power generation performance (voltage) of the fuel cell at 600° C. is checked. The result is shown in Table 2.

Thereafter, the fuel cell was heated to 750° C. by the use of an electric furnace and was subjected to a power generation test for 3 hours under the conditions of a fuel utilization of 75% and a current density of 0.3 A/cm$^2$ and the power generation performance (voltage) of the fuel cell at 750° C. was checked. The result is shown in Table 2.

Then, the fuel cell was allowed to generate power at 750° C. for 1000 hours under the conditions of a fuel utilization of 75% and a current density of 0.6 A/cm$^2$. At this time, the voltage after 1000 hours was measured using the value at a power generation time of 0 as an initial voltage, and the variation from the initial voltage was calculated as a decay rate, and the decay rate of the power generation performance was calculated.

As to the evaluation of the decay of the power generation performance, the decay rate of less than 0.5% was evaluated as extremely small, the decay rate of 0.5% to 1% was evaluated as pretty small, the decay rate of 1 to 3% was evaluated as small, the decay rate of 3 to 5% was evaluated as large, and the decay rate of equal to or more than 5% was evaluated as intense. The evaluation results are shown in Table 2.

TABLE 2

| | Intermediate layer | | | | | | | |
|---|---|---|---|---|---|---|---|---|
| | First layer | | | Second layer | | | | |
| Sample No. | Source composition | Thickness (μm) | Presence of Zr | Source composition | Thickness (μm) | Baking temperature | Presence of Zr | Fixing strength |
| 1 | $CeO_2$ | 0.5 | Present | $CeO_2$ ($SmO_{1.5}$) | 10 | 1100 | Absent | Present |
| 2 | $CeO_2$ | 1 | Present | $CeO_2$ ($SmO_{1.5}$) | 10 | 1200 | Absent | Present |
| 3 | $CeO_2$ | 5 | Present | $CeO_2$ ($SmO_{1.5}$) | 15 | 1300 | Absent | Present |
| 4 | $CeO_2$ | 5 | Present | $CeO_2$ ($SmO_{1.5}$) | 20 | 1300 | Absent | Present |
| 5 | $CeO_2$ | 5 | Present | $CeO_2$ ($YO_{1.5}$) | 10 | 1300 | Absent | Present |
| 6 | $CeO_2$ | 5 | Present | $CeO_2$ ($YbO_{1.5}$) | 5 | 1300 | Absent | Present |
| 7 | $CeO_2$ | 10 | Present | $CeO_2$ ($GdO_{1.5}$) | 30 | 1300 | Absent | Present |
| 8 | $CeO_2$ | 1 | Present | $CeO_2$ ($GdO_{1.5}$) | 1 | 1300 | Absent | Present |
| 9 | $CeO_2$ | 5 | Present | $CeO_2$ ($GdO_{1.5}$) | 10 | 1300 | Absent | Present |
| 10 | $CeO_2$ | 5 | Present | $CeO_2$ ($GdO_{1.5}$) | 5 | 1400 | Present | Present |
| 11 | $CeO_2$ | 5 | Present | $CeO_2$ ($GdO_{1.5}$) | 5 | 1500 | Present | Present |
| 12 | — | — | — | $CeO_2$ ($SmO_{1.5}$) | 10 | 1200 | Present | Absent |
| 13 | — | — | — | $CeO_2$ ($SmO_{1.5}$) | 10 | 1300 | Present | Absent |
| 14 | — | — | — | $CeO_2$ ($SmO_{1.5}$) | 10 | 1400 | Present | Present |
| 15 | — | — | — | $CeO_2$ ($SmO_{1.5}$) | 10 | 1500 | Present | Present |
| 16 | $CeO_2$ ($SmO_{1.5}$) | 5 | Present | — | — | — | — | — |
| 17 | $CeO_2$ ($GdO_{1.5}$) | 5 | Present | $CeO_2$ ($GdO_{1.5}$) | 10 | 1100 | Absent | Present |
| 18 | $CeO_2$ ($GdO_{1.5}$) | 5 | Present | $CeO_2$ ($GdO_{1.5}$) | 20 | 1200 | Absent | Present |
| 19 | $CeO_2$ ($GdO_{1.5}$) | 5 | Present | $CeO_2$ ($GdO_{1.5}$) | 5 | 1300 | Absent | Present |
| 20 | $CeO_2$ ($GdO_{1.5}$) | 1 | Present | $CeO_2$ ($GdO_{1.5}$) | 10 | 1300 | Absent | Present |
| *21 | $CeO_2$ | 1 | Present | $CeO_2$ ($GdO_{1.5}$) | 10 | 1400 | Present | Present |
| *22 | $CeO_2$ ($GdO_{1.5}$) | 1 | Present | $CeO_2$ ($GdO_{1.5}$) | 10 | 1400 | Present | Present |
| *23 | $CeO_2$ ($GdO_{1.5}$) | 5 | Present | $CeO_2$ ($GdO_{1.5}$) | 10 | 1400 | Present | Present |

TABLE 2-continued

| Sample No. | Presence of Sr in solid electrolyte layer | Ratio of Y and Zr in site where the maximum content of Y is detected in site of solid electrolyte layer within 1 μm from interface thereof with intermediate layer | Ratio of rare-earth element excluding Ce, and Zr at site of solid electrolyte layer, the site being 0.5 μm away from interface between solid electrolyte layer and intermediate layer | Power generation performance | | | |
|---|---|---|---|---|---|---|---|
| | | | | Voltage at 600° C. (mV) | Voltage at 750° C. (mV) | Decay rate (%) | Evaluation |
| 1 | Absent | 0.173 | 0.004 | 734 | 859 | 0.4%/1000 h | Extremely small |
| 2 | Absent | 0.171 | 0.006 | 720 | 858 | 0.4%/1000 h | Extremely small |
| 3 | Absent | 0.182 | 0.023 | 680 | 821 | 0.3%/1000 h | Extremely small |
| 4 | Absent | 0.223 | 0.025 | 677 | 765 | 0.4%/1000 h | Extremely small |
| 5 | Absent | 0.193 | 0.02 | 682 | 807 | 0.3%/1000 h | Extremely small |
| 6 | Absent | 0.183 | 0.02 | 684 | 816 | 0.3%/1000 h | Extremely small |
| 7 | Absent | 0.174 | 0.03 | 676 | 846 | 0.7%/1000 h | Pretty small |
| 8 | Absent | 0.192 | 0.02 | 710 | 811 | 0.8%/1000 h | Pretty small |
| 9 | Absent | 0.184 | 0.05 | 659 | 804 | 0.7%/1000 h | Pretty small |
| 10 | Absent | 0.179 | 0.04 | 668 | 835 | 3.1%/1000 h | Large |
| 11 | Absent | 0.183 | 0.07 | 655 | 812 | 3.2%/1000 h | Large |
| 12 | Absent | 0.191 | 0.11 | 254 | 809 | 6%/1000 h | Intense |
| 13 | Absent | 0.179 | 0.12 | 267 | 821 | 6%/1000 h | Intense |
| 14 | Present | 0.188 | 0.8 | 398 | 812 | 5%/1000 h | Intense |
| 15 | Present | 0.236 | 0.9 | 347 | 752 | 5%/1000 h | Intense |
| 16 | Present | 0.250 | 0.9 | 252 | 756 | 5%/1000 h | Intense |
| 17 | Absent | 0.210 | 0.11 | 542 | 767 | 0.3%/1000 h | Extremely small |
| 18 | Absent | 0.191 | 0.12 | 530 | 798 | 0.2%/1000 h | Extremely small |
| 19 | Absent | 0.187 | 0.16 | 541 | 805 | 0.4%/1000 h | Extremely small |
| 20 | Absent | 0.179 | 0.11 | 548 | 842 | 0.4%/1000 h | Extremely small |
| *21 | Absent | 0.332 | 0.004 | 612 | 648 | 3.3%/1000 h | Large |
| *22 | Absent | 0.320 | 0.045 | 608 | 642 | 3.1%/1000 h | Large |
| *23 | Absent | 0.343 | 0.029 | 602 | 641 | 3.4%/1000 h | Large |

Asterisk (*) represents out of the range of the invention

From the results shown in Table 2, in Sample Nos. 1 to 20 in which the stacked compact was calcined, it can be seen that the value obtained by dividing the maximum content of Y in the site of the solid electrolyte layer within 1 μm from the interface thereof with the intermediate layer by the content of Zr in the site where the maximum content of Y was detected was equal to or less than 0.25. The site having a large content of Y did not appear in the site of the solid electrolyte layer within 1 μm from the interface thereof with the intermediate layer.

In addition, it can be seen that the voltage at 750° C. (mV) was equal to or more than 750 mV and the power generation performance at a high temperature was improved.

On the contrary, in Sample Nos. 21 to 23 in which the stacked compact was not calcined, it can be seen that the value obtained by dividing the maximum content of Y in the site of the solid electrolyte layer within 1 μm from the interface thereof with the intermediate layer by the content of Zr in the site where the maximum content of Y was detected was equal to or more than 0.32. The site having a large content of Y appears in the site of the solid electrolyte layer within 1 μm from the interface thereof with the intermediate layer. The voltage at 750° C. (mV) was equal to or less than 650 mV.

From the results shown in Table 2, in Sample Nos. 1 to 11 in which the intermediate layer was formed using $CeO_2$ solid solution having a rare-earth element excluding Ce as the source powder of the second layer and using $CeO_2$ ($CeO_2$ solid solution having no rare-earth element) as the source powder of the first layer, it can be seen that the value obtained by dividing the content of the rare-earth element excluding Ce in the intermediate layer by the content of Zr was equal to or less than 0.1 at the site of the solid electrolyte layer, the site being 0.5 μm away from the interface between the solid electrolyte layer and the intermediate layer, the voltage at 600° C. (mV) was equal to or more than 650 mV, and the power generation performance at a low temperature was improved.

When the first layer and the solid electrolyte layer were co-fired and the second layer was fired at a temperature lower by 200° C. or higher than the co-firing temperature (Samples Nos. 1 to 9), it can be seen that Zr did not diffuse into the second layer, the fixing strength of the second layer was superior, Sr which is the component of the air electrode layer 1 was not contained in the solid electrolyte layer, and the deterioration in power generation performance was very small.

When the first layer and the second layer were made to be thicker or thinner (Sample Nos. 7 to 9), it can be seen that Zr did not diffuse into the second layer, the fixing strength of the second layer was superior, Sr which is the component of the air electrode layer 1 was not contained in the solid electrolyte layer, and the deterioration in power generation performance was very small.

On the other hand, when the first layer was co-fired but the second layer was fired at a temperature equal to or higher than 1400° C., that is, when the firing temperature of the second layer was lower than the co-firing temperature but the temperature difference was lower than 200° C. (Sample Nos. 10 and 11), it can be seen that Sr which is the component of the air electrode layer 1 was not contained in the solid electrolyte layer, the fixing strength of the second layer was superior, and the voltage at 600° C. (mV) was equal to or higher than 650 mV, but the diffusion of Zr into the second layer appeared and thus the deterioration in power generation performance was large.

When the second layer was stacked on the sintered body without the first layer (Sample Nos. 12 to 15) or when the second layer was not formed (Sample No. 16), it can be seen that the value obtained by dividing the content of the rare-earth element excluding Ce in the intermediate layer by the content of Zr was more than 0.1 at the site of the solid electrolyte layer, the site being 0.5 μm away from the interface between the solid electrolyte layer and the intermediate layer, the voltage at 600° C. (mV) was less than 650 mV, the power generation performance at a low temperature was lowered, and the deterioration in power generation performance was intense. In Sample Nos. 14 and 15, the fixing strength was present, but this is because the fixing strength was enhanced due to Zr in the solid electrolyte layer and Zr diffusing into the second layer.

In Sample Nos. 17 to 20 in which the first layer and the second layer were formed using the source powder of $CeO_2$ solid solution having the rare-earth element excluding Ce, it can be seen that Zr did not diffuse into the second layer, the fixing strength of the second layer was superior, Sr which was the component of the air electrode layer was not contained in the solid electrolyte layer, and the deterioration in power generation performance was pretty small, but that the value obtained by dividing the content of the rare-earth element excluding Ce in the intermediate layer by the content of Zr was more than 0.1 at the site of the solid electrolyte layer, the site being 0.5 μm away from the interface between the solid electrolyte layer and the first layer, the voltage at 600° C. (mV) was equal to or less than 600 mV, and the power generation performance at a low temperature was lowered.

REFERENCE SIGNS LIST

1: Air electrode layer
4: Intermediate layer
4a: First layer
4b: Second layer
9: Solid electrolyte layer
10: Fuel cell
11: Fuel cell module
13: Cell stack
19: Fuel cell device

The invention claimed is:

1. A fuel cell, comprising:
a solid electrolyte layer containing Zr;
an intermediate layer containing $CeO_2$ solid solution having a rare-earth element excluding Ce;
an air electrode layer containing Sr, the intermediate layer and the air electrode layer being stacked in this order on one surface of the solid electrolyte layer; and
a fuel electrode layer on another surface of the solid electrolyte layer which is opposite to the one surface,
wherein a value obtained by dividing a molar content of the rare-earth element excluding Ce by a molar content of Zr is equal to or less than 0.05 at a site of the solid electrolyte layer which is 1 μm away from an interface between the solid electrolyte layer and the intermediate layer, and
wherein a value obtained by dividing a molar content of the rare-earth element excluding Ce by a molar content of Zr at a site of the solid electrolyte layer which is 0.5 μm away from the interface is greater than the value obtained by dividing the molar content of the rare-earth element excluding Ce by the molar content of Zr at the site of the solid electrolyte layer which is 1 μm away from the interface.

2. The fuel cell according to claim 1, wherein the value obtained by dividing the molar content of the rare-earth element excluding Ce by molar content of Zr is equal to or less than 0.1 at the site of the solid electrolyte layer which is 0.5 μm away from the interface between the solid electrolyte layer and the intermediate layer.

3. The fuel cell according to claim 1, wherein the intermediate layer comprises a first layer located on a surface of the solid electrolyte layer and a second layer formed on the first layer and located on a surface of the air electrode layer, and the first layer is denser than the second layer.

4. The fuel cell according to claim 3, wherein a thickness of the first layer is in a range of 0.5 to 10 μm, and a thickness of the second layer is in a range of 1 to 20 μm.

5. A cell stack, comprising:
a plurality of fuel cells according to claim 1,
wherein the plurality of fuel cells are electrically connected in series to each other.

6. A fuel cell module, comprising:
the cell stack according to claim 5; and
a housing configured to receive the cell stack therein.

7. A fuel cell device, comprising:
the fuel cell module according to claim 6;
an auxiliary device configured to operate the cell stack; and
an exterior case configured to receive the fuel cell module and the auxiliary device therein.

8. A fuel cell, comprising:
a solid electrolyte layer containing Zr and Y;
an intermediate layer containing $CeO_2$ solid solution having a rare-earth element excluding Ce;
an air electrode layer containing Sr, the intermediate layer and the air electrode layer being stacked in this order on one surface of the solid electrolyte layer; and
a fuel electrode layer on another surface of the solid electrolyte layer which is opposite to the one surface,
wherein a value obtained by dividing a maximum molar content of Y in a site of the solid electrolyte layer within 1 μm from an interface thereof with the intermediate layer by a molar content of Zr in the site where the maximum molar content of Y is detected is equal to or less than 0.25, and
wherein a value obtained by dividing a molar content of the rare-earth element excluding Ce by a molar content of Zr at a site of the solid electrolyte layer which is 0.5 μm away from the interface between the solid electrolyte layer and the intermediate layer is smaller than a value obtained by dividing a molar content of the rare-earth element excluding Ce by the molar content of Ze in the site where the maximum molar content of Y is detected.

9. The fuel cell according to claim 8, wherein the value obtained by dividing the molar content of the rare-earth element excluding Ce by the molar content of Zr is equal to or less than 0.1 at the site of the solid electrolyte layer which is 0.5 μm away from the interface between the solid electrolyte layer and the intermediate layer.

10. The fuel cell according to claim 8, wherein the intermediate layer comprises a first layer located on a surface of the solid electrolyte layer and a second layer formed on the first layer and located on a surface of the air electrode layer, and the first layer is denser than the second layer.

11. The fuel cell according to claim 10, wherein a thickness of the first layer is in a range of 0.5 to 10 μm, and a thickness of the second layer is in a range of 1 to 20 μm.

12. A cell stack, comprising:
a plurality of fuel cells according to claim 8,
wherein the plurality of fuel cells are electrically connected in series to each other.

13. A fuel cell module, comprising:
the cell stack according to claim 12; and
a housing configured to receive the cell stack therein.

14. A fuel cell device, comprising:
the fuel cell module according to claim 13;
an auxiliary device configured to operate the cell stack; and
an exterior case configured to receive the fuel cell module and the auxiliary device therein.

* * * * *